US012656363B2

(12) United States Patent
Wong et al.

(10) Patent No.: US 12,656,363 B2
(45) Date of Patent: Jun. 16, 2026

(54) DECAPPING OF SCREW CAP TEST TUBES

(71) Applicant: Helix OpCo, LLC, San Mateo, CA (US)

(72) Inventors: David Wong, San Marcos, CA (US); Stinson Lamb, Oceanside, CA (US); Anthuan Cruz, La Jolla, CA (US)

(73) Assignee: Helix, Inc., San Mateo, CA (US)

( * ) Notice: Subject to any disclaimer, the term of this patent is extended or adjusted under 35 U.S.C. 154(b) by 662 days.

(21) Appl. No.: 18/101,682

(22) Filed: Jan. 26, 2023

(65) Prior Publication Data

US 2024/0255535 A1 Aug. 1, 2024

(51) Int. Cl.
| | |
|---|---|
| *G01N 35/04* | (2006.01) |
| *B01L 9/06* | (2006.01) |
| *B65D 39/08* | (2006.01) |
| *B67B 7/18* | (2006.01) |

(52) U.S. Cl.
CPC ............... *G01N 35/04* (2013.01); *B01L 9/06* (2013.01); *B65D 39/08* (2013.01); *B67B 7/18* (2013.01); *G01N 2035/0405* (2013.01); *G01N 2035/0465* (2013.01)

(58) Field of Classification Search
None
See application file for complete search history.

(56) References Cited

U.S. PATENT DOCUMENTS

| | | | | |
|---|---|---|---|---|
| 4,794,801 A | * | 1/1989 | Andrews ............... | G01L 5/0042 |
| | | | | 73/847 |
| 9,199,755 B1 | * | 12/2015 | Cohen ....................... | B67B 7/02 |

| | | | | |
|---|---|---|---|---|
| 2008/0170967 A1 | * | 7/2008 | Itoh ........................... | B67B 7/02 |
| | | | | 422/400 |
| 2011/0088517 A1 | * | 4/2011 | Tsujimura ........... | G01N 35/026 |
| | | | | 81/3.2 |
| 2014/0174028 A1 | * | 6/2014 | Yamagata .............. | G01N 35/00 |
| | | | | 53/287 |

(Continued)

FOREIGN PATENT DOCUMENTS

| | | | | |
|---|---|---|---|---|
| DE | 102011008975 A1 | * | 7/2012 | ............. B67B 7/182 |
| JP | 3359701 B2 | * | 12/2002 | |
| JP | 2004256131 A | * | 9/2004 | |

(Continued)

OTHER PUBLICATIONS

The Kinex ES Decapper; https://www.kinexcappers.com/es-bottle-cappers/.
The Pluggo Decapper; https://lgpconsulting.com/pluggo-decapper/.

*Primary Examiner* — P. Kathryn Wright
(74) *Attorney, Agent, or Firm* — Duft & Bornsen, PC

(57) ABSTRACT

Decapping system and methods of performing a decapping process for screw cap test tubes. In an embodiment, a method comprises loading a test tube rack in a rack holder that holds the test tube rack stationary, where the test tube rack holds the screw cap test tubes aligned in a row. The method further comprises clamping the row of the screw cap test tubes between a pair of jaw members of a row clamp, where clamp surfaces of the jaw members apply a force to opposing sides of the row of the screw cap test tubes. The method further comprises successively contacting screw caps of the screw cap test tubes in the row with a rotating bit of a decapper tool to spin the screw caps in a loosening direction.

20 Claims, 19 Drawing Sheets

(56) References Cited

U.S. PATENT DOCUMENTS

2014/0190131 A1 * 7/2014 Bjork ........................ B67B 7/02
                                                    81/3.09
2023/0249956 A1 * 8/2023 Numata ................ B67B 3/2073
                                                    53/317

FOREIGN PATENT DOCUMENTS

JP        2005003425 A  *  1/2005
WO     WO-2023158142 A1 *  8/2023   ............... B67B 7/18

* cited by examiner

FIG. 5
500
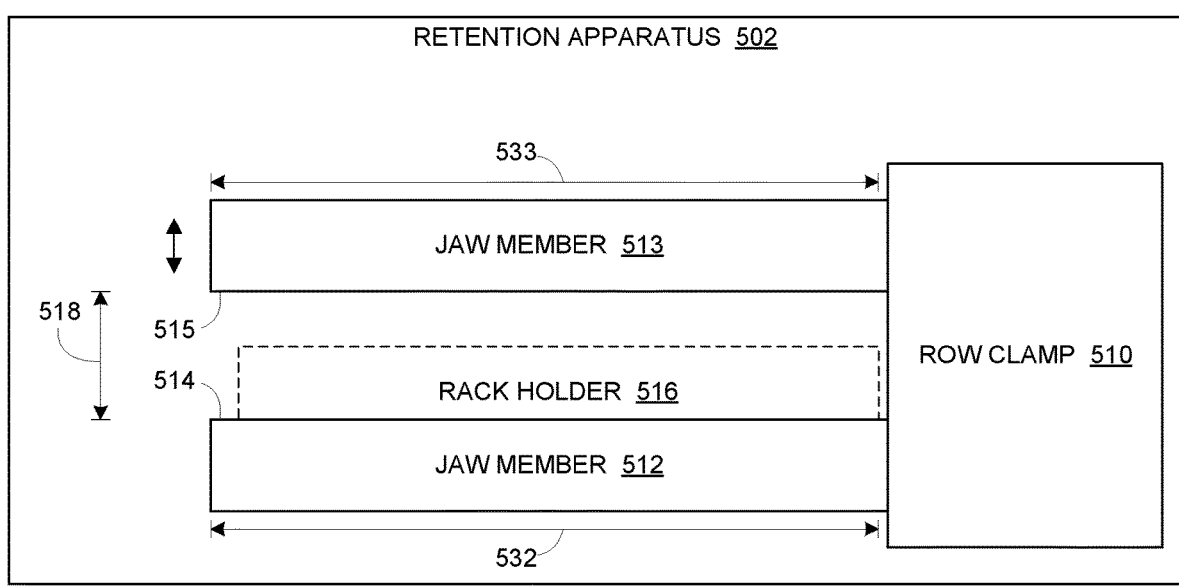
RETENTION APPARATUS 502
533
JAW MEMBER 513
518
515
514
RACK HOLDER 516
JAW MEMBER 512
ROW CLAMP 510
532
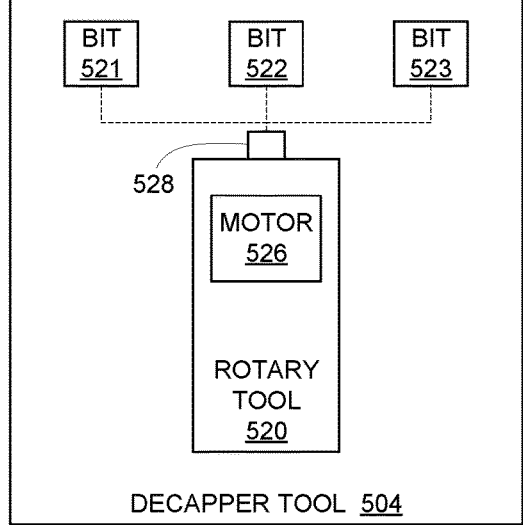
BIT 521     BIT 522     BIT 523
528
MOTOR 526
ROTARY TOOL 520
DECAPPER TOOL 504

*FIG. 6*
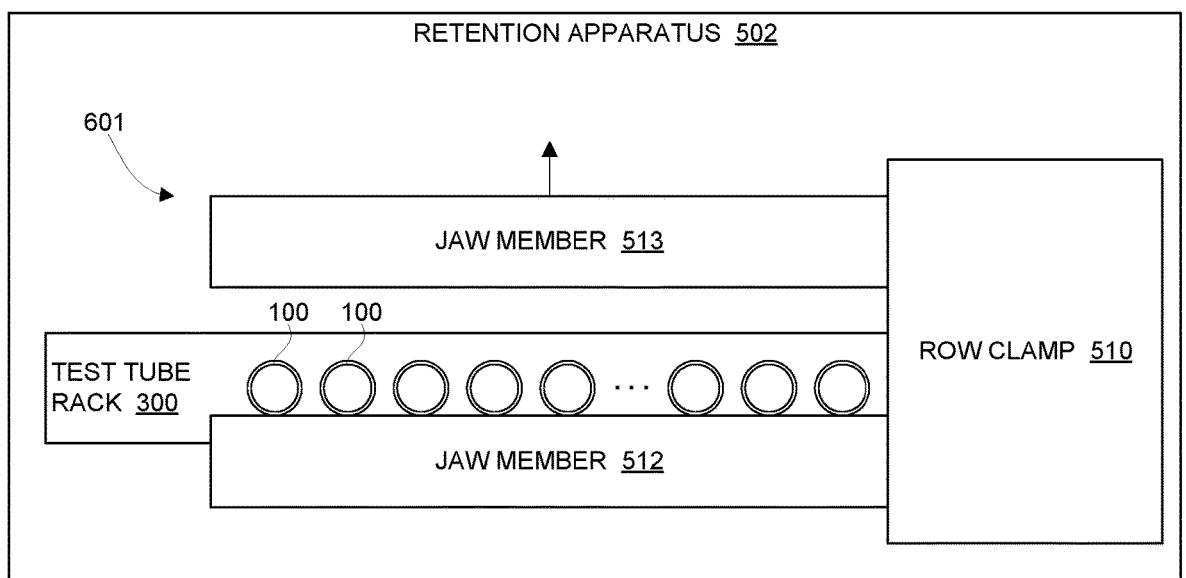
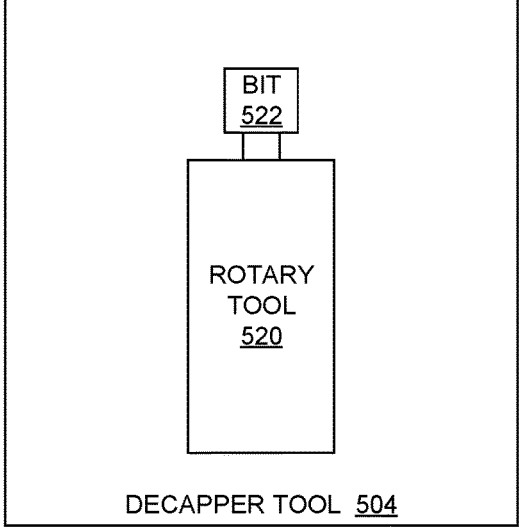

*FIG. 7*
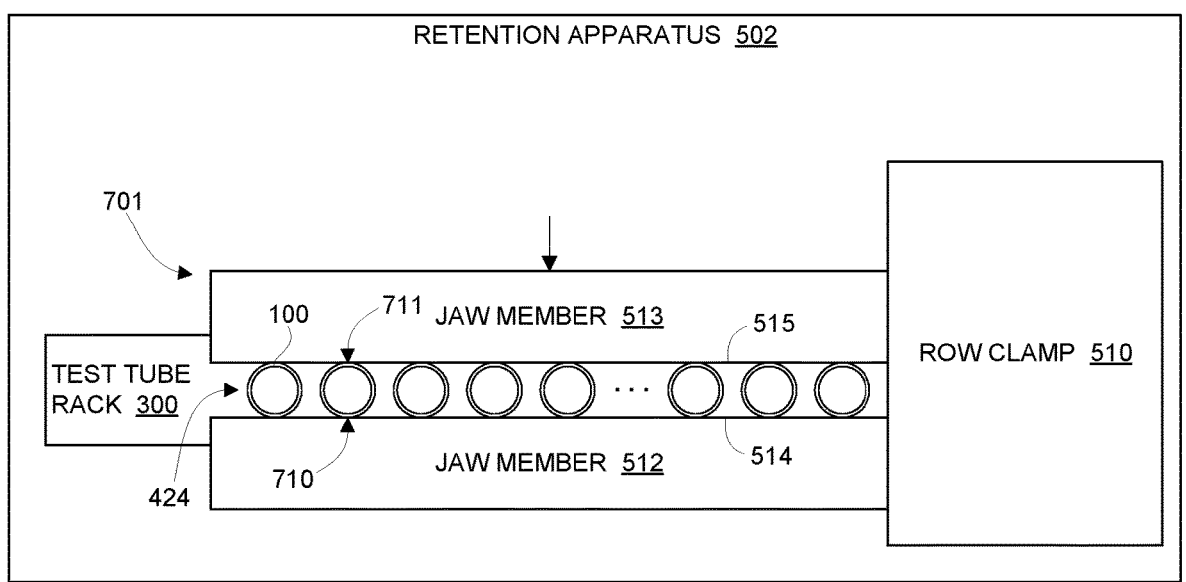
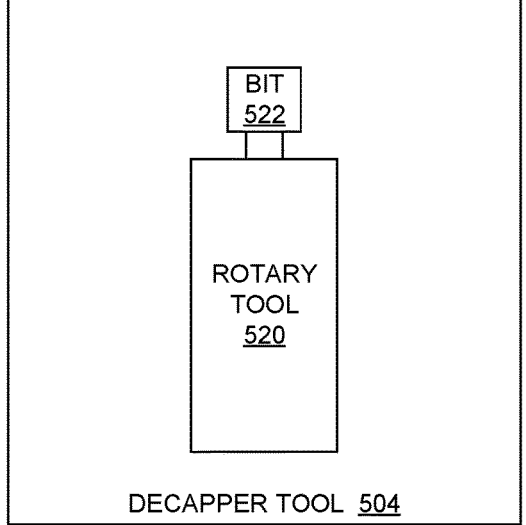

FIG. 9
500
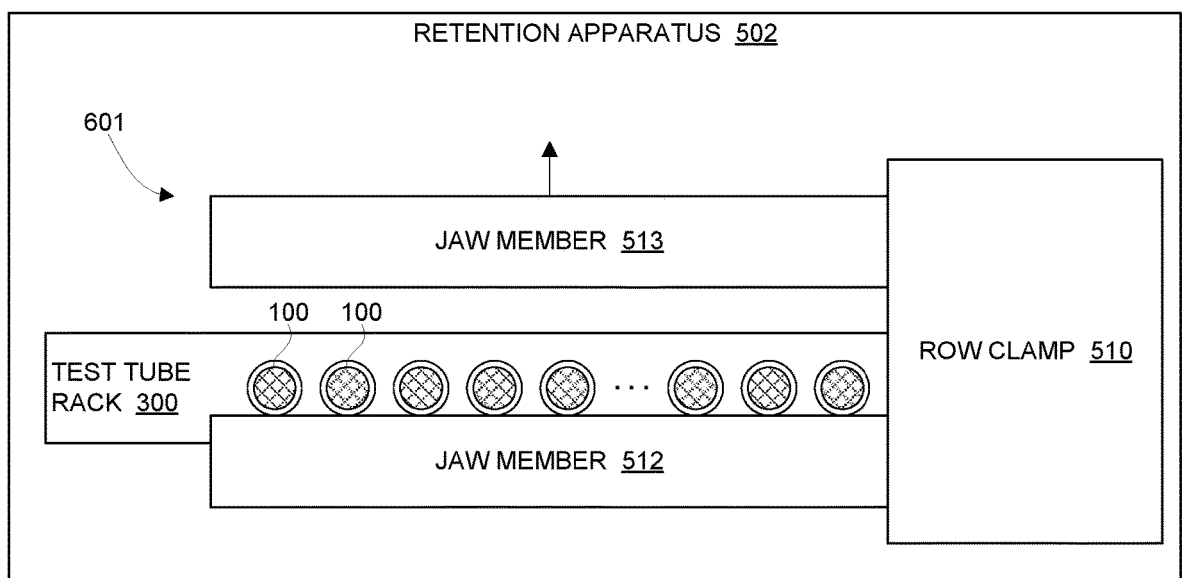
RETENTION APPARATUS  502
601
JAW MEMBER  513
100    100
TEST TUBE RACK  300
ROW CLAMP  510
JAW MEMBER  512
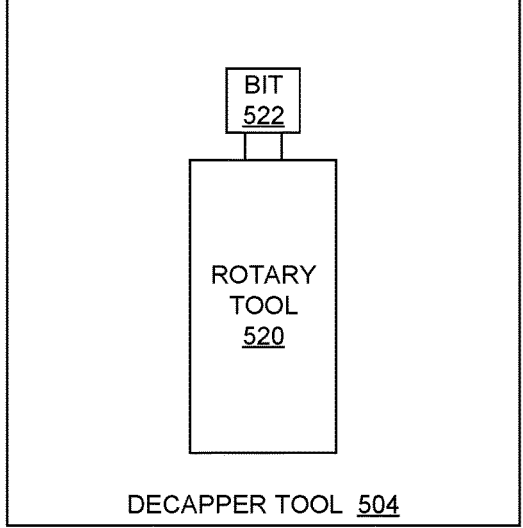
BIT
522
ROTARY TOOL
520
DECAPPER TOOL  504

FIG. 10
500
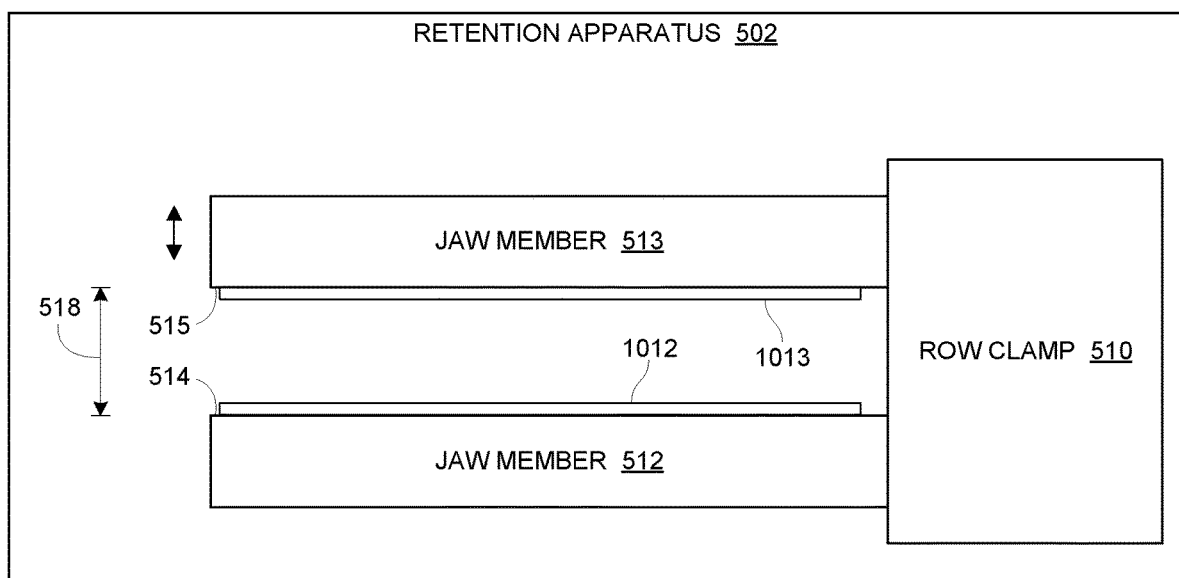
RETENTION APPARATUS 502
JAW MEMBER 513
515
1012    1013
ROW CLAMP 510
518
514
JAW MEMBER 512
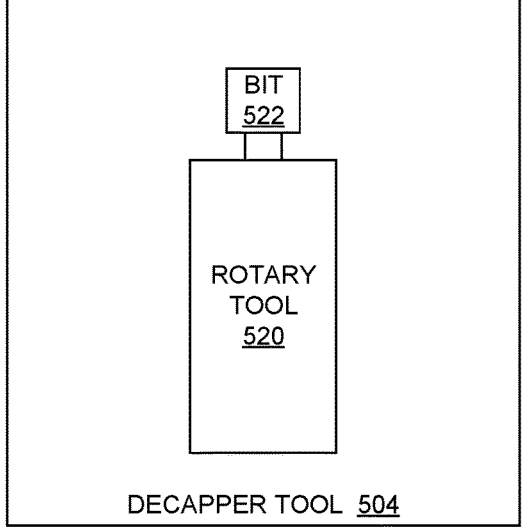
BIT
522
ROTARY
TOOL
520
DECAPPER TOOL 504

FIG. 11
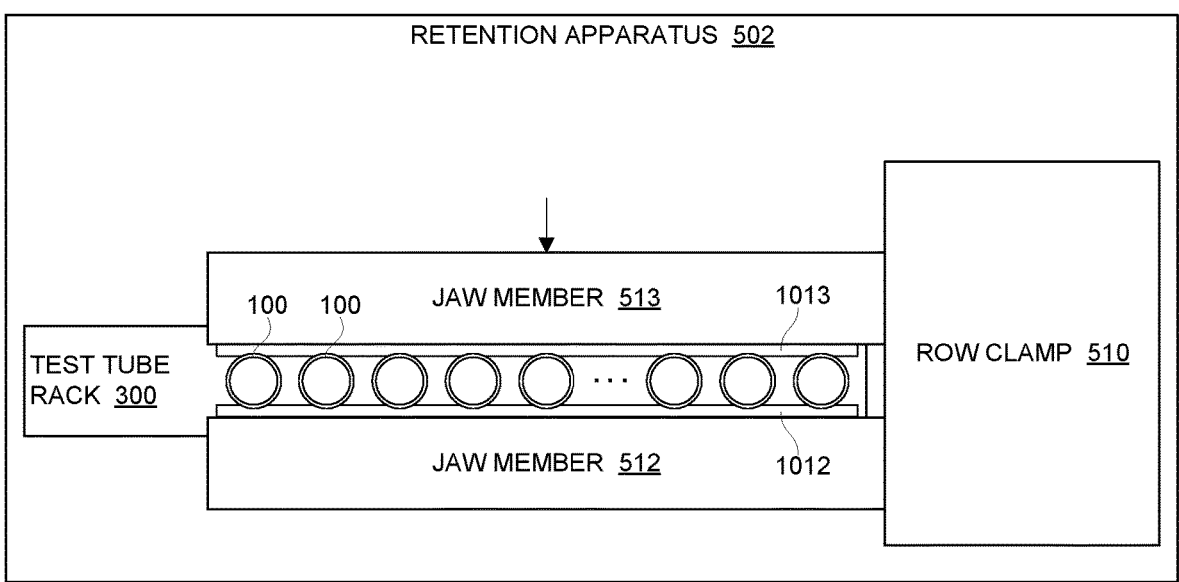
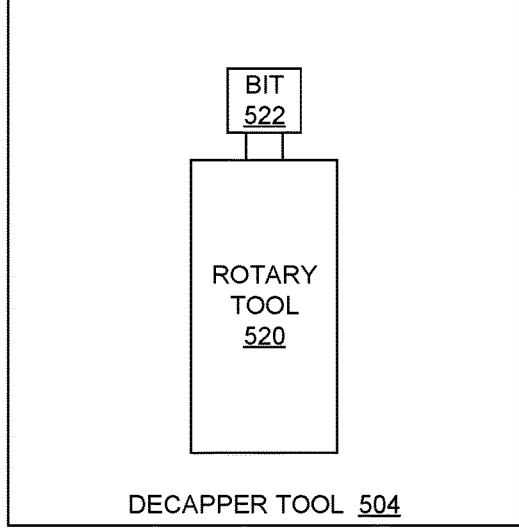

FIG. 12
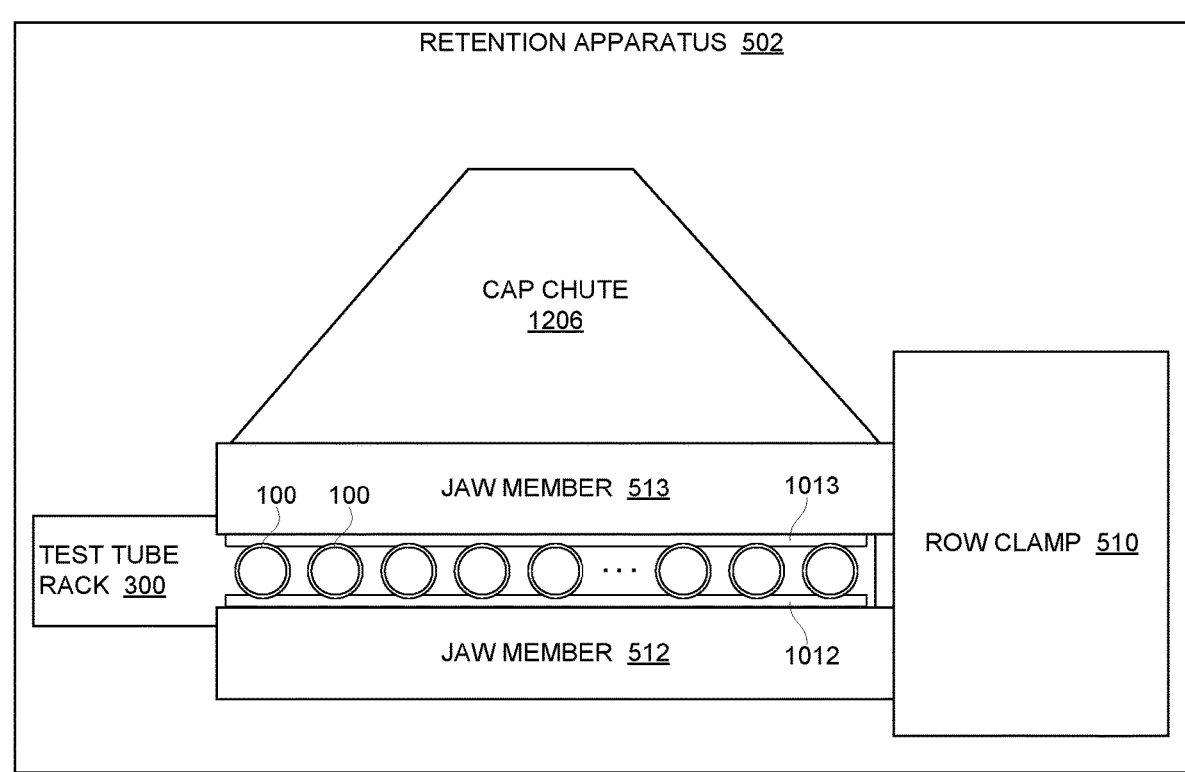
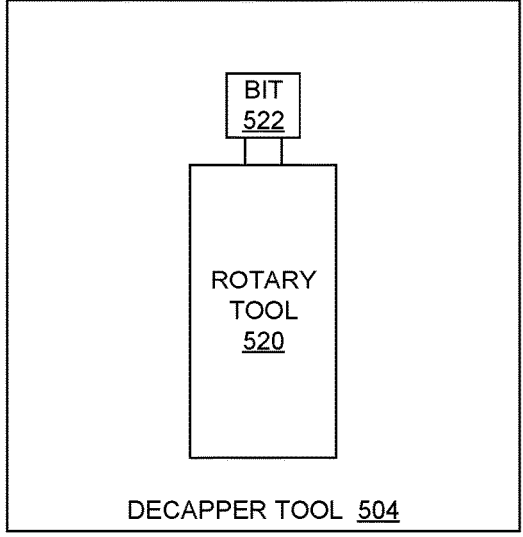

FIG. 13
500
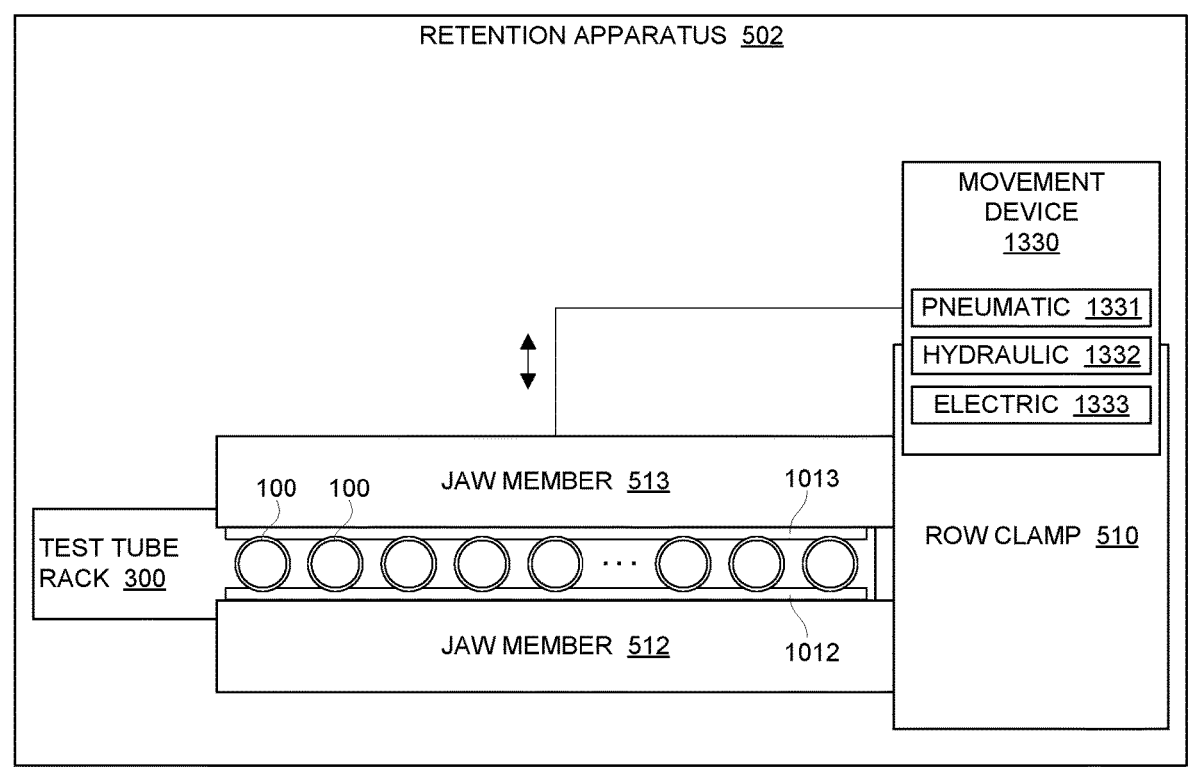
RETENTION APPARATUS 502
MOVEMENT DEVICE 1330
PNEUMATIC 1331
HYDRAULIC 1332
ELECTRIC 1333
JAW MEMBER 513     1013
100  100
TEST TUBE RACK 300
ROW CLAMP 510
JAW MEMBER 512     1012
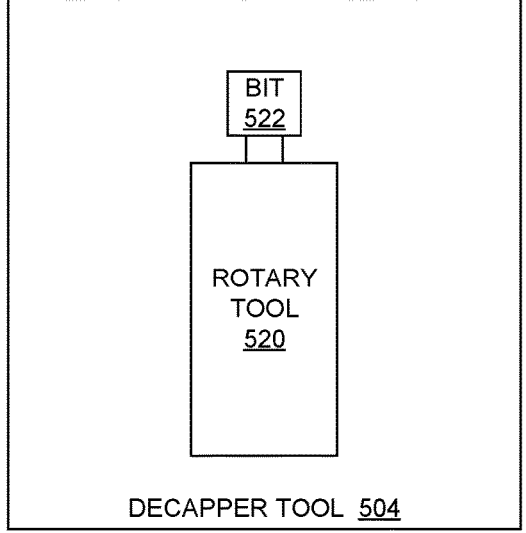
BIT 522
ROTARY TOOL 520
DECAPPER TOOL 504

*FIG. 14*    1400
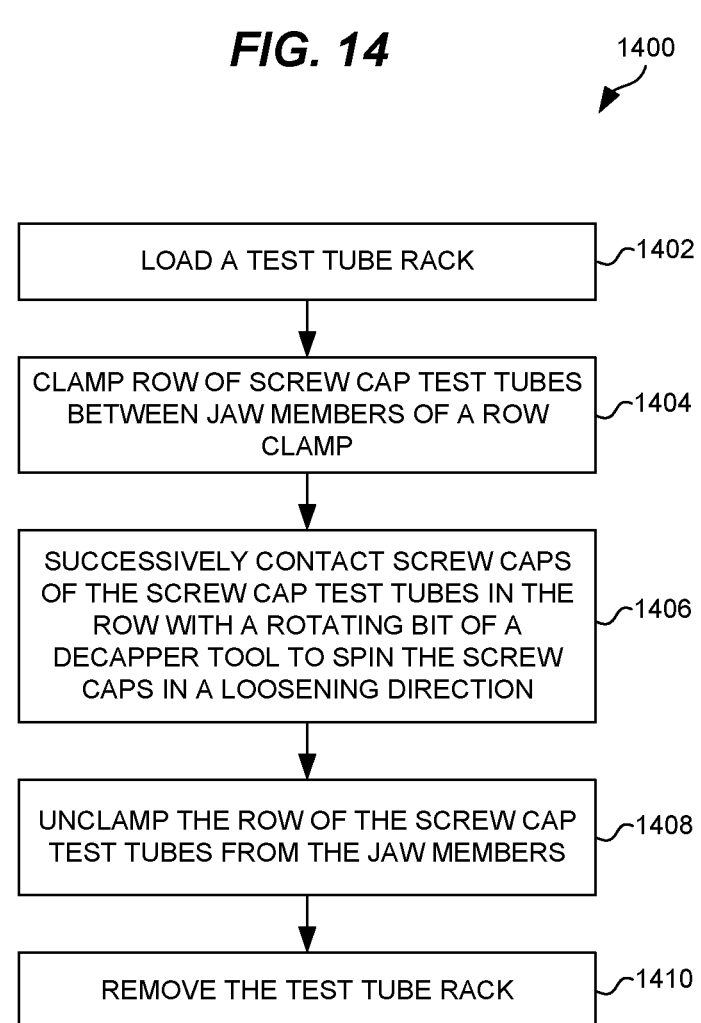
LOAD A TEST TUBE RACK    1402
CLAMP ROW OF SCREW CAP TEST TUBES BETWEEN JAW MEMBERS OF A ROW CLAMP    1404
SUCCESSIVELY CONTACT SCREW CAPS OF THE SCREW CAP TEST TUBES IN THE ROW WITH A ROTATING BIT OF A DECAPPER TOOL TO SPIN THE SCREW CAPS IN A LOOSENING DIRECTION    1406
UNCLAMP THE ROW OF THE SCREW CAP TEST TUBES FROM THE JAW MEMBERS    1408
REMOVE THE TEST TUBE RACK    1410

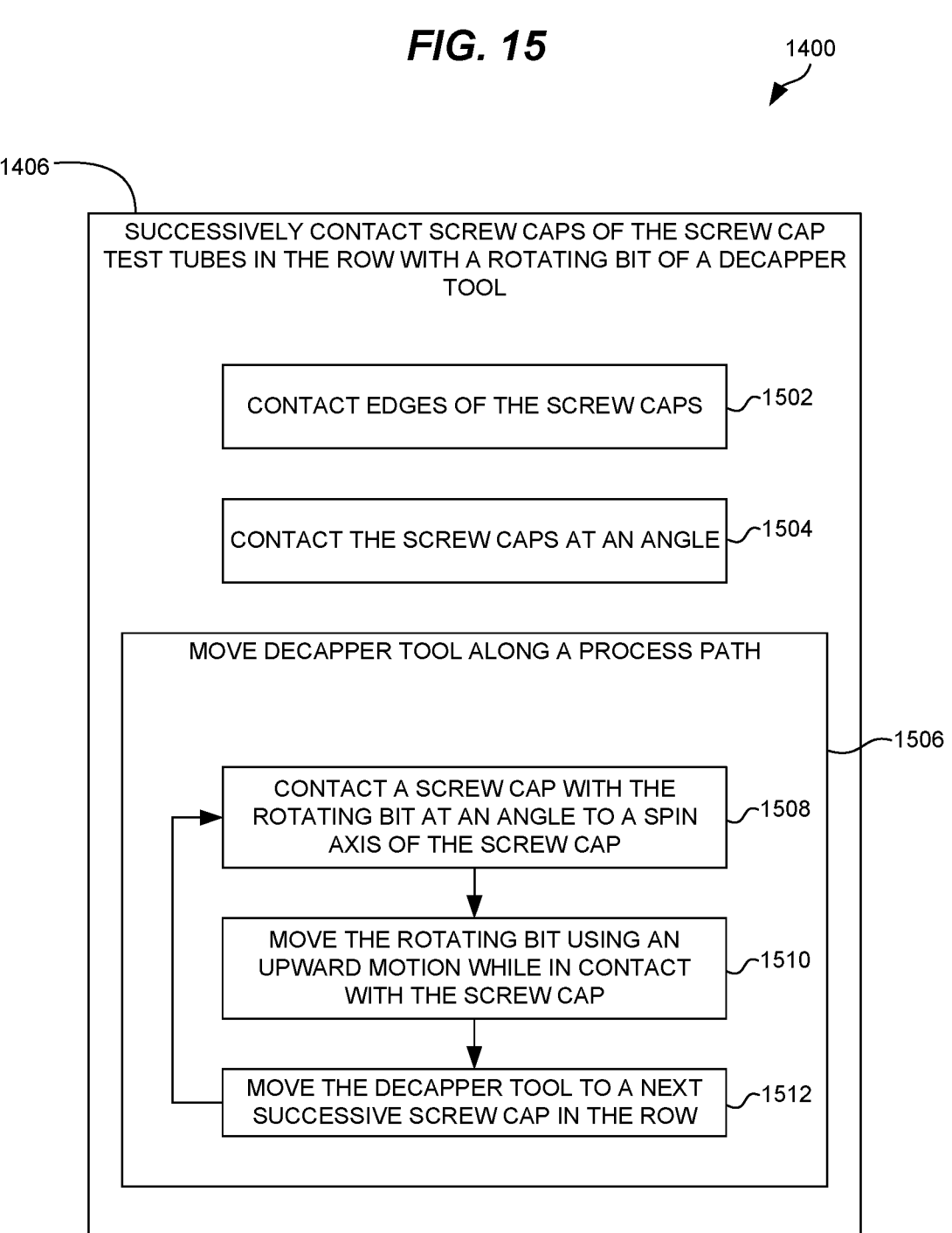

1406

SUCCESSIVELY CONTACT SCREW CAPS OF THE SCREW CAP TEST TUBES IN THE ROW WITH A ROTATING BIT OF A DECAPPER TOOL

CONTACT EDGES OF THE SCREW CAPS — 1502

CONTACT THE SCREW CAPS AT AN ANGLE — 1504

MOVE DECAPPER TOOL ALONG A PROCESS PATH

— 1506

CONTACT A SCREW CAP WITH THE ROTATING BIT AT AN ANGLE TO A SPIN AXIS OF THE SCREW CAP — 1508

MOVE THE ROTATING BIT USING AN UPWARD MOTION WHILE IN CONTACT WITH THE SCREW CAP — 1510

MOVE THE DECAPPER TOOL TO A NEXT SUCCESSIVE SCREW CAP IN THE ROW — 1512

FIG. 16
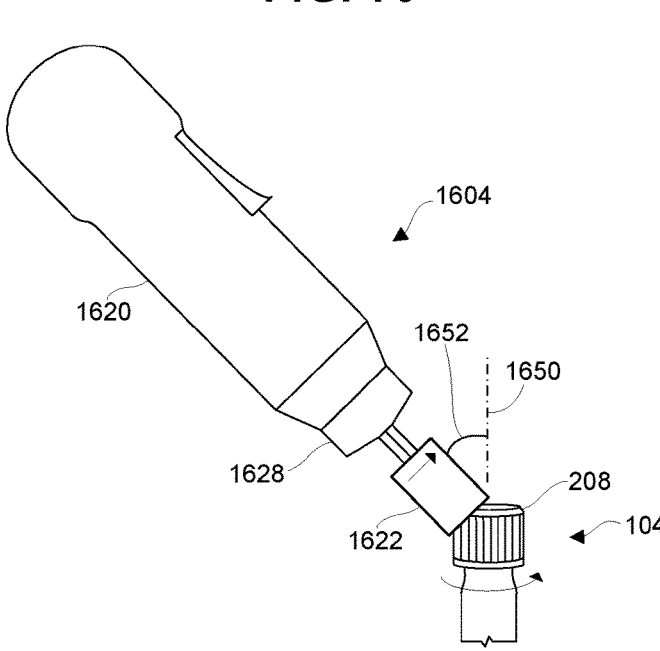
FIG. 17
FIG. 18
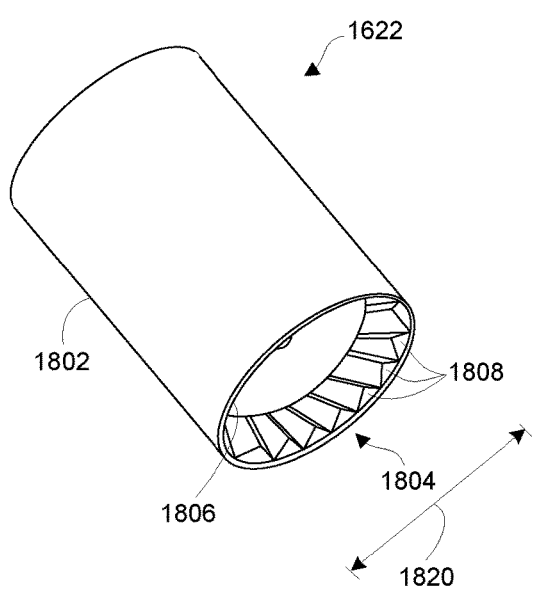

1604

1620

1628          1912

208

1622          104

2002

2010

2006

2008

2004

1622

424

100

104

513

512

1400

1404

CLAMP ROW OF SCREW TOP TEST TUBES BETWEEN JAW MEMBERS OF A ROW CLAMP

ACTIVATE A PNEUMATIC ACTUATOR — 2102

ACTIVATE A HYDRAULIC ACTUATOR — 2104

ACTIVATE AN ELECTRIC ACTUATOR — 2106

CONTACT A GRASPABLE PORTION OF THE SCREW CAP TEST TUBES WITH THE JAW MEMBERS — 2108

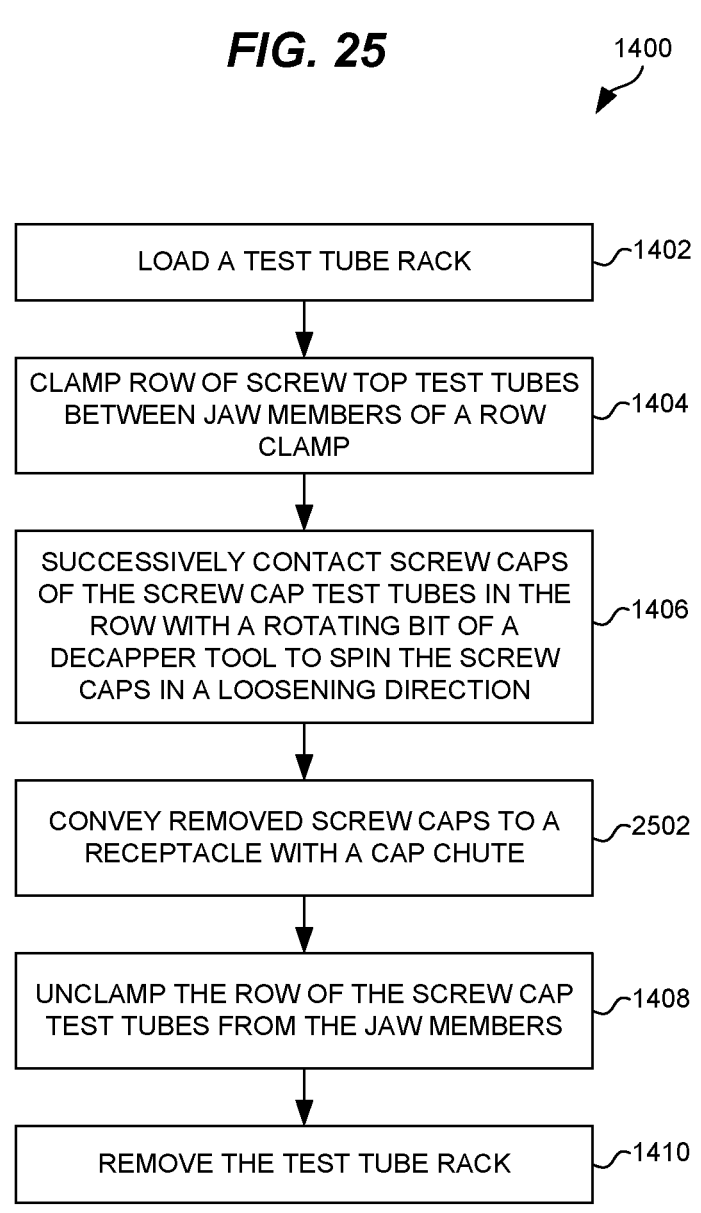

LOAD A TEST TUBE RACK — 1402

CLAMP ROW OF SCREW TOP TEST TUBES BETWEEN JAW MEMBERS OF A ROW CLAMP — 1404

SUCCESSIVELY CONTACT SCREW CAPS OF THE SCREW CAP TEST TUBES IN THE ROW WITH A ROTATING BIT OF A DECAPPER TOOL TO SPIN THE SCREW CAPS IN A LOOSENING DIRECTION — 1406

CONVEY REMOVED SCREW CAPS TO A RECEPTACLE WITH A CAP CHUTE — 2502

UNCLAMP THE ROW OF THE SCREW CAP TEST TUBES FROM THE JAW MEMBERS — 1408

REMOVE THE TEST TUBE RACK — 1410

DECAPPING OF SCREW CAP TEST TUBES

TECHNICAL FIELD

The following disclosure relates to the field of laboratory tools or processes.

BACKGROUND

Samples, such as saliva samples, are commonly received in screw cap test tubes where the screw caps are screwed into place onto the test tubes. Unscrewing a large number of test tubes (e.g., thousands or tens of thousands) in a laboratory environment is a daunting task. For example, unscrewing a large number of test tubes by hand is not feasible. Automated machines are expensive, occupy a great deal of space in a laboratory, and result in down-time for maintenance and/or malfunctions. Further, automated machines may have difficulty opening test tubes of varying sizes or diameters.

SUMMARY

Embodiments described herein provide for a decapping system and associated methods for unscrewing screw caps from test tubes. As an overview, the decapping system allows for tool-assisted manual decapping using a row clamp along with a decapper tool. The row clamp is configured to secure multiple screw cap test tubes that are aligned in a row within a test tube rack. The decapper tool is fitted with a rotating bit configured to engage the screw caps one-by-one as the decapper tool is "walked" along the row of screw cap test tubes, such as by a human operator. As the rotating bit engages a screw cap, the rotating bit imparts an unscrewing rotation to the screw cap. This unseals the screw caps from the test tubes, and may also remove the screw caps from the test tubes. One technical benefit is the screw caps may be quickly and efficiently unscrewed or removed from many screw cap test tubes without manually unscrewing or needing an automated machine.

In an embodiment, a method of performing a decapping process for screw cap test tubes comprises loading a test tube rack in a rack holder that holds the test tube rack stationary, where the test tube rack holds the screw cap test tubes aligned in a row. The method further comprises clamping the row of the screw cap test tubes between a pair of jaw members of a row clamp, where clamp surfaces of the jaw members apply a force to opposing sides of the row of the screw cap test tubes. The method further comprises successively contacting screw caps of the screw cap test tubes in the row with a rotating bit of a decapper tool to spin the screw caps in a loosening direction.

In an embodiment, the method further comprises unclamping the row of the screw cap test tubes from the jaw members, and removing the test tube rack.

In an embodiment, successively contacting the screw caps comprises contacting edges of the screw caps with the rotating bit.

In an embodiment, successively contacting the screw caps comprises contacting each screw cap of the screw caps with the rotating bit at an angle to a spin axis of the screw cap.

In an embodiment, the angle is in a range of about 30-45 degrees to the spin axis of the screw cap.

In an embodiment, successively contacting the screw caps comprises iteratively performing: contacting a screw cap of a screw cap test tube in the row with the rotating bit at an angle to a spin axis of the screw cap to spin the screw cap in the loosening direction, moving the rotating bit using an upward motion while in contact with the screw cap to lift the screw cap, and moving the decapper tool to a next successive screw cap in the row.

In an embodiment, clamping the row of the screw cap test tubes comprises activating a pneumatic actuator to move at least one of the jaw members.

In an embodiment, clamping the row of the screw cap test tubes comprises activating a hydraulic actuator to move at least one of the jaw members.

In an embodiment, clamping the row of the screw cap test tubes comprises activating an electric actuator to move at least one of the jaw members.

In an embodiment, clamping the row of the screw cap test tubes comprises contacting a graspable portion of the screw cap test tubes between a top surface of the test tube rack and a bottom end of the screw caps with the clamp surfaces of the jaw members.

In an embodiment, the method further comprises conveying the screw caps removed from the screw cap test tubes to a receptacle with a cap chute.

In an embodiment, loading the test tube rack comprises loading the test tube rack at an angle to a vertical plane in a range of about 30-45 degrees.

In an embodiment, a method of performing a decapping process for screw cap test tubes comprises loading a test tube rack in a rack holder that holds the test tube rack stationary, where the test tube rack holds the screw cap test tubes aligned in a row. The method further comprises clamping the row of the screw cap test tubes between a pair of jaw members of a row clamp, where the jaw members include clamp surfaces that contact opposing sides of the row of the screw cap test tubes. The method further comprises moving a decapper tool along a process path while the jaw members immobilize the screw cap test tubes. Along the process path, a rotating bit of the decapper tool successively contacts each screw cap of the screw cap test tubes in the row at an angle to a spin axis of the screw cap to impart an unscrewing rotation to the screw cap.

In an embodiment, a decapping system comprises a retention apparatus configured to receive a test tube rack that holds screw cap test tubes aligned in a row. The retention apparatus comprises a row clamp comprising a pair of jaw members having clamp surfaces configured to contact opposing sides of the row of the screw cap test tubes. The decapping system further comprises a decapper tool comprising a rotating bit configured to successively contact screw caps of the screw cap test tubes in the row to spin the screw caps in a loosening direction.

In an embodiment, the clamp surfaces of the jaw members are configured to contact a graspable portion of the screw cap test tubes between a top surface of the test tube rack and a bottom end of the screw caps.

In an embodiment, the row clamp further comprises a pliable material disposed along at least one of the clamp surfaces.

In an embodiment, the row clamp further comprises a pneumatic actuator configured to move at least one of the jaw members.

In an embodiment, the retention apparatus further comprises a cap chute configured to convey the screw caps removed from the screw cap test tubes to a receptacle.

In an embodiment, the clamp surfaces are disposed at an angle to a vertical plane in a range of about 30-45 degrees.

In an embodiment, the rotating bit comprises a hollow cylindrical member with surface features disposed along an inner cylindrical surface of the hollow cylindrical member, and an inner diameter of the hollow cylindrical member is between about 0.5 and 1.5 times a diameter of the screw caps.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIGS. 5-13 are schematic block diagrams of a decapping system in illustrative embodiments.

FIG. 14 is a flow chart illustrating a method of performing a decapping process in an illustrative embodiment.

FIG. 15 is a flow chart illustrating additional details of the method of FIG. 14 in an illustrative embodiment.

FIG. 16 illustrates a rotating bit contacting a screw cap in an illustrative embodiment.

FIGS. 17-18 illustrate bits in illustrative embodiments.

FIG. 25 is a flow chart illustrating additional details of the method of FIG. 14 in an illustrative embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
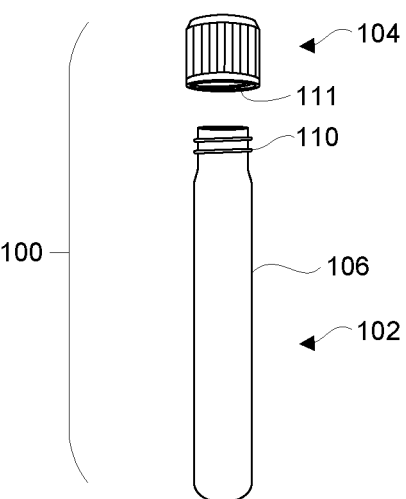
FIG. 1 is a perspective view of a screw cap test tube.

FIG. 1 is a perspective view of a screw cap test tube 100. Screw cap test tube 100 (also referred to as a screw top test tube) is an apparatus configured to hold or contain a sample (e.g., a liquid sample, such as saliva). Screw cap test tube 100 includes a threaded test tube 102 and a screw cap 104. In general, threaded test tube 102 includes a body 106 that is open at the top and closed at the bottom, and includes threads 110 at its top. Threaded test tube 102 may be made from plastic, but other types of materials are considered herein. Screw cap 104 is a closure for threaded test tube 102. Screw cap 104 includes threads 111 configured to engage with threads 110 of threaded test tube 102 so that screw cap 104 screws onto threaded test tube 102 and creates a seal.

Figure 2:
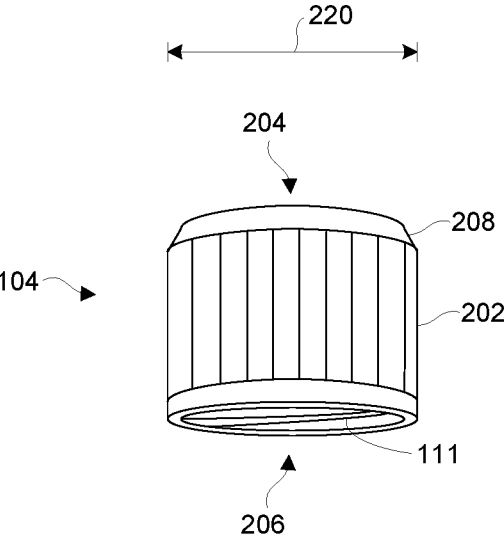
FIG. 2 is a perspective view of a screw cap.

FIG. 2 is a perspective view of screw cap 104. Screw cap 104 is generally a cylindrical member that is closed at a top end 204 and open at a bottom end 206. Screw cap 104 includes an annular side wall 202 disposed between top end 204 and bottom end 206. An edge 208 of screw cap 104 is formed at an intersection between top end 204 and side wall 202. Edge 208 may be beveled as illustrated in FIG. 2, but may be rounded, square, or have other shapes.

Figure 3:
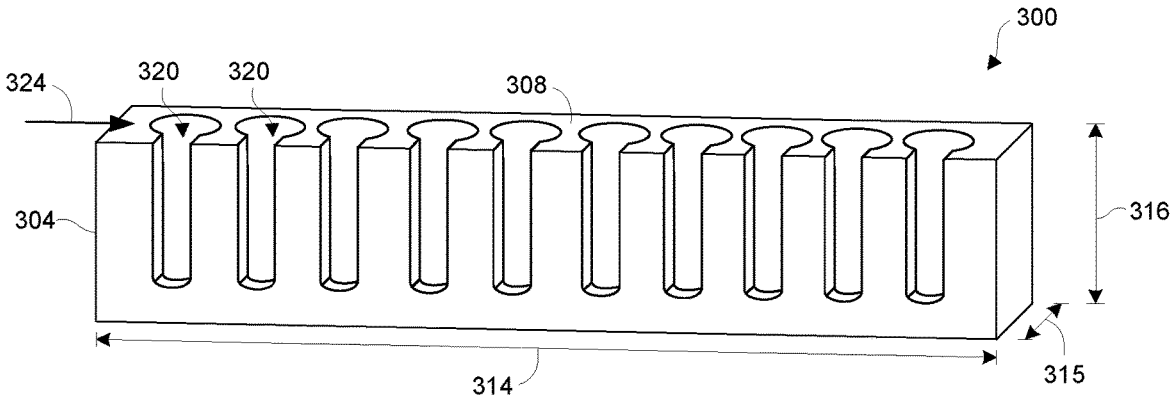
FIG. 3 is a perspective view of a test tube rack.

FIG. 3 is a perspective view of a test tube rack 300. Test tube rack 300 (also referred to as a test tube carrier) is a piece of laboratory equipment configured to hold multiple test tubes upright. Test tube rack 300 includes an elongated body member 304, and a plurality of test tube channels 320 (also referred to as test tube wells) disposed along a length 314 of body member 304. Test tube channels 320 may comprise cylindrically-shaped holes that extend from a top surface 308 downward a particular depth into body member 304. Test tube channels 320 are oriented vertically in body member 304 to hold test tubes generally upright. The number of test tube channels 320 illustrated in FIG. 3 is provided as an example, and different numbers of test tube channels 320 are considered herein. For example, a test tube rack 300 may have between twenty and fifty test tube channels 320 in some embodiments. Also, although cylindrically-shaped test tube channels 320 are illustrated, other shapes are considered for test tube channels 320. Test tube channels 320 may be arranged in a single row 324 along the length 314 of body member 304 as illustrated in FIG. 3, so test tube rack 300 may be referred to as a linear test tube rack. Test tube rack 300 may be made from plastic, metal, or another type of rigid or semi-rigid material.

Figure 4:
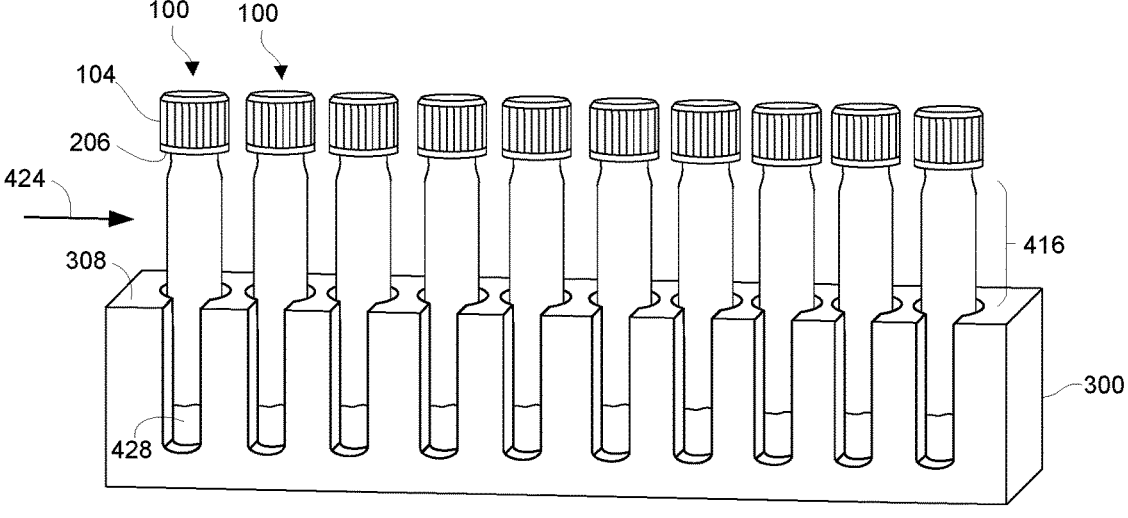
FIG. 4 is a perspective view of a test tube rack holding a plurality of screw cap test tubes.

FIG. 4 is a perspective view of test tube rack 300 holding a plurality of screw cap test tubes 100. Screw cap test tubes 100 are inserted in test tube channels 320 (see also, FIG. 3), which hold the screw cap test tubes 100 generally upright in a row 424 (e.g., single row). In general, test tube channels 320 are larger than screw cap test tubes 100, such as to accommodate test tubes of varying sizes. Thus, test tube rack 300 may loosely hold the screw cap test tubes 100, which means the screw cap test tubes 100 are able to spin freely within test tube channels 320 if not secured in another manner.

In this example, it is assumed that screw caps 104 are tightened onto screw cap test tubes 100 to seal a sample 428 (e.g., a liquid sample, such as saliva) in screw cap test tubes 100. In a laboratory environment, screw caps 104 may have to be unscrewed and removed from screw cap test tubes 100 to access the samples 428. Described below are a decapping system and associated methods for unscrewing/removing screw caps 104 from screw cap test tubes 100. As a general overview of the decapping system, a row clamp is configured to grasp and hold the row 424 of screw cap test tubes 100 while a decapper tool engages the screw caps 104 to unscrew or loosen the screw caps 104. As illustrated in FIG.

4, screw cap test tubes 100 project a distance above the top surface 308 of test tube rack 300 due to a length of screw cap test tubes 100 and the height 316 of test tube rack 300 (see also, FIG. 3). The distance between the top surface 308 of test tube rack 300 and the bottom end 206 of screw caps 104 provides a graspable portion 416 of the screw cap test tubes 100 where the row clamp is able to grasp and hold the row 424 of screw cap test tubes 100.

FIGS. 5-13 are schematic block diagrams of a decapping system 500 in illustrative embodiments. In FIG. 5, decapping system 500 includes a retention apparatus 502 and a decapper tool 504. Retention apparatus 502 is a mechanical device configured to secure a plurality of screw cap test tubes 100 stationary during a decapping process. In an embodiment, retention apparatus 502 includes a row clamp 510 and a rack holder 516. Row clamp 510 is a mechanical clamping device configured to apply an anti-rotation clamping force concurrently to screw cap test tubes 100 in a row 424 held by test tube rack 300. One technical benefit of clamping on the screw cap test tubes 100 themselves, as opposed to clamping just on the test tube rack 300, for example, is that the screw cap test tubes 100 may be able to freely spin within the test tube rack 300, and row clamp 510 prevents spinning of the screw cap test tubes 100 during a decapping process.

In an embodiment, row clamp 510 comprises opposing jaw members 512-513 (e.g., a pair of jaw members 512-513). Jaw member 512 includes a clamp surface 514, which is a surface of jaw member 512 configured to apply a clamping force to a row 424 of screw cap test tubes 100. In an embodiment, clamp surface 514 may be referred to as a linear clamp surface as clamp surface 514 is generally straight or linear. In further embodiments, clamp surface 514 may be contoured (e.g., having indentations aligning with test tube channels 320) or irregularly shaped. The length 532 of clamp surface 514 is at least as long as a row 424 of screw cap test tubes 100. Jaw member 513 also includes a clamp surface 515, which is a surface of jaw member 513 configured to apply a clamping force to a row 424 of screw cap test tubes 100. Clamp surface 515 of jaw member 513 faces and is generally parallel to clamp surface 514 of jaw member 512. In an embodiment, clamp surface 515 may be referred to as a linear clamp surface as clamp surface 515 is generally straight or linear. In further embodiments, clamp surface 515 may be contoured (e.g., having indentations aligning with test tube channels 320) or irregularly shaped. The length 533 of clamp surface 515 is at least as long as a row 424 of screw cap test tubes 100. One or both of jaw members 512-513 are configured to move toward and away from one another in a direction generally perpendicular to clamp surfaces 514-515. For example, jaw member 512 may be fixed, and jaw member 513 may be slidable or movable in relation to jaw member 512 in one embodiment.

A rack holder 516 is disposed below or beneath a gap 518 between jaw members 512-513. Rack holder 516 is a structure that holds a test tube rack 300 (or multiple test tube racks 300). Rack holder 516 may comprise a rectangular channel or the like having similar dimensions as a test tube rack 300. For example, rack holder 516 may have a similar length and width as the length 314 and width 315 of test tube rack 300 so that test tube rack 300 may be at least partially inserted in rack holder 516. However, other configurations are considered herein for rack holder 516.

Decapper tool 504 comprises a rotary tool 520 and one or more bits 521-523. Rotary tool 520 is a handheld power tool comprising a motor 526 (e.g., electric motor, battery-powered motor, pneumatic motor, etc.) configured to rotate or spin a rotating end 528. A bit 521-523 is an end attachment of rotary tool 520, and is configured to attach to rotating end 528 of rotary tool 520. Because bits 521-523 are configured to rotate or are rotating in operation, they may be referred to herein as rotating bits. A human operator manipulates the decapper tool 504 for the decapping process.

In FIG. 6, one or both of jaw members 512-513 are moved away from one another to an unclamped position 601. In the unclamped position 601, the gap 518 between jaw members 512-513 is sufficient to allow a test tube rack 300 to be loaded into rack holder 516 of retention apparatus 502. In FIG. 7, one or both of jaw members 512-513 are moved toward one another to a clamped position 701. In the clamped position 701, the gap 518 between jaw members 512-513 decreases so that jaw members 512-513 engage or secure opposing sides 710-711 of the row 424 of screw cap test tubes 100 to hold the screw cap test tubes 100 stationary. For example, clamp surface 514 of jaw member 512 interacts, contacts (i.e., directly or indirectly), or applies a force on one side 710 (e.g., a first side) of the row 424 of screw cap test tubes 100, and clamp surface 515 of jaw member 513 interacts, contacts (i.e., directly or indirectly), or applies a force on an opposing side 711 (e.g., a second side) of the row 424 of screw cap test tubes 100. Jaw members 512-513 apply pressure in a desired pressure range (e.g., about two to five pounds per square inch) to prevent rotation of screw cap test tubes 100, while avoiding deforming or crushing of screw cap test tubes 100.

Figure 8:
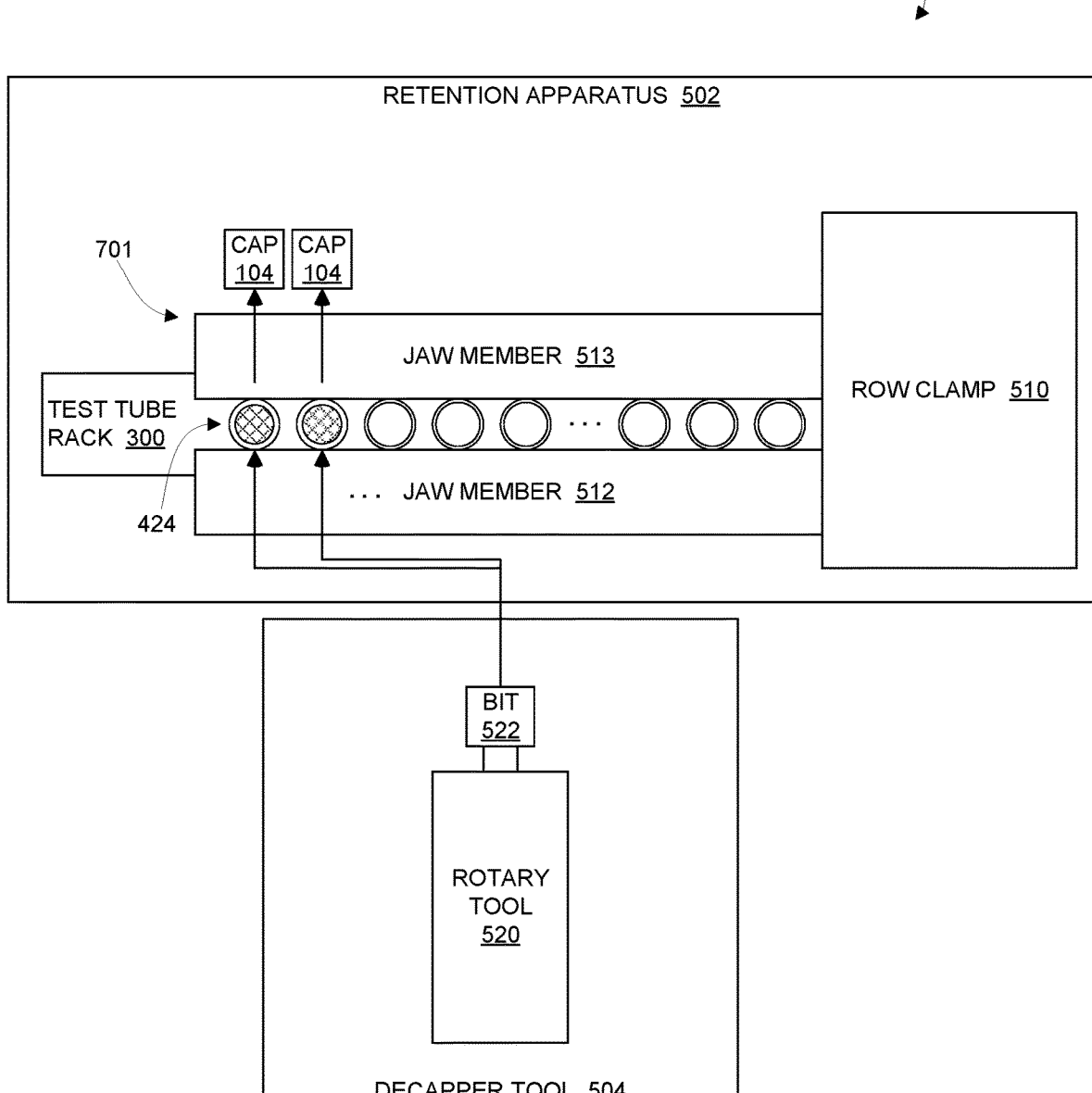

In FIG. 8, with screw cap test tubes 100 immobilized by row clamp 510, bit 522 (while in rotation) of decapper tool 504 is moved into contact with individual screw caps 104. Contact between rotating bit 522 and a screw cap 104 causes the screw cap 104 to spin in a loosening direction (e.g., counterclockwise) such that the screw cap 104 is unscrewed. For example, decapper tool 504 may be moved so that rotating bit 522 contacts successive screw caps 104 in row 424 (such as starting from the first screw cap 104 to the left in row 424). Decapper tool 504 may unscrew the screw caps 104 without removal, and the screw caps 104 may be removed at a later time. Alternatively, decapper tool 504 may unscrew and remove the screw caps 104 simultaneously.

In FIG. 9, when each of the screw caps 104 in row 424 are unscrewed/removed, one or both of jaw members 512-513 are moved away from one another to the unclamped position 601. In the unclamped position 601, the gap 518 between jaw members 512-513 is sufficient to allow the test tube rack 300 to be removed from rack holder 516 of retention apparatus 502.

A technical benefit of decapping system 500 is that the screw caps 104 for many screw cap test tubes 100 may be quickly and efficiently unscrewed/removed. Thus, the screw caps 104 do not have be unscrewed by hand, and an expensive automated machine is not needed that takes up laboratory space. Also, the decapper tool 504 is relatively inexpensive so that multiple decapper tools 504 may be kept on hand. If a decapper tool 504 fails, there is no need to halt operations at the laboratory as a reserve decapper tool 504 may be used as a replacement.

FIGS. 10-13 illustrate additional structural features of decapping system 500. In FIGS. 10-11, jaw member 512 may include a pliable material 1012 disposed along clamp surface 514. Likewise, jaw member 513 may include a pliable material 1013 disposed along clamp surface 515. The pliable material 1012-1013 may comprise rubber, foam, etc., and may have a thickness in the range of about one-quarter inch to one-half inch. One technical benefit is the pliable material 1012-1013 may assist in immobilizing the screw cap test tubes 100 so that they do not spin when the screw caps 104 are unscrewed. Further, the pliable material 1012-1013 may prevent row clamp 510 from applying excessive pressure to screw cap test tubes 100 during a decapping process. When a pliable material 1012-1013 is disposed along clamp surfaces 514-515, the clamp surfaces 514-515 may not directly contact the screw cap test tubes 100. Thus, "contact" by clamp surfaces 514-515 as described herein may comprise direct contact with the screw cap test tubes 100, or indirect contact through a pliable material 1012-1013 or another material disposed between clamp surfaces 514-515 and screw cap test tubes 100.

In FIG. 12, retention apparatus 502 may further include a cap chute 1206. Cap chute 1206 comprises a sloping channel or slide configured to convey screw caps 104, which are removed from screw cap test tubes 100, to a receptacle (not shown).

In FIG. 13, row clamp 510 may further comprise a movement device 1330 configured to produce or impart movement to one or both of jaw members 512-513. In an embodiment, row clamp 510 may comprise a power clamp, and movement device 1330 may include one or more pneumatic actuators 1331 (e.g., pneumatic cylinders), one or more hydraulic actuators 1332, one or more electric actuators 1333, etc. In an embodiment, movement device 1330 may comprise a manually-operated device, such as a ratcheting device, a ball-screw, etc.

One or more of the structural features disclosed above may be combined for decapping system 500.

FIG. 14 is a flow chart illustrating a method 1400 of performing a decapping process in an illustrative embodiment. The steps of method 1400 will be described with reference to decapping system 500 in FIGS. 5-13, but those skilled in the art will appreciate that method 1400 may be performed in other systems or devices. Also, the steps of the flow charts described herein are not all inclusive and may include other steps not shown, and the steps may be performed in an alternative order.

For method 1400 in FIG. 14, a test tube rack 300 (or multiple test tube racks) is loaded or registered onto retention apparatus 502 (step 1402). For example, test tube rack 300 may be loaded into rack holder 516 of retention apparatus 502 with jaw members 512-513 in the unclamped position 601 (see FIG. 6). Rack holder 516 is configured to hold test tube rack 300 stationary during the decapping process.

With test tube rack 300 registered in retention apparatus 502, the row 424 of screw cap test tubes 100 is clamped between jaw members 512-513 of row clamp 510 (step 1404). In other words, each screw cap test tube 100 in the row 424 is immobilized simultaneously or concurrently by an anti-rotation clamping force applied by jaw members 512-513. To do so, one or both of jaw members 512-513 are moved toward one another to a clamped position 701 (see FIG. 7). In the clamped position 701, the clamp surface 514 of jaw member 512 contacts each screw cap test tube 100 on one side 710 of the row 424, while the clamp surface 515 of jaw member 513 contacts each screw cap test tube 100 on the other side 711 of the row 424. Thus, each screw cap test tube 100 is sandwiched between clamp surfaces 514-515 with a desired clamping force that prevents rotation of the screw cap test tubes 100.

With screw cap test tubes 100 restrained by row clamp 510, the rotating bit 522 of decapper tool 504 successively contacts screw caps 104 of the screw cap test tubes 100 in the row 424 to spin the screw caps in a loosening direction (step 1406). When rotating bit 522 makes contact with a screw cap 104, frictional contact between the rotating bit 522 and the screw cap 104 imparts an unscrewing rotation to the screw cap 104 (i.e., in a loosening direction, such as a counterclockwise direction). Consequently, screw cap 104 unscrews (fully or partially) from threaded test tube 102.

With the screw caps 104 unscrewed or removed, the row 424 of screw cap test tubes 100 may be unclamped from jaw members 512-513 (step 1408). For example, one or both of jaw members 512-513 may be moved away from one another to the unclamped position 601 (see FIG. 9). Test tube rack 300 may then be removed from retention apparatus 502 (step 1410). Method 1400 may then be repeated with another test tube rack 300.

FIG. 15 is a flow chart illustrating additional details of method 1400 in an illustrative embodiment. More particularly, FIG. 15 illustrates optional steps of step 1406 of FIG. 14. When contacting the screw caps 104 with the rotating bit 522 of decapper tool 504 (see step 1406) in an embodiment, the rotating bit 522 may contact edges 208 of the screw caps 104 (optional step 1502). In an embodiment, rotating bit 522 may contact each screw cap 104 at an angle to a spin axis of the screw cap 104 (optional step 1504).

FIG. 16 illustrates a rotating bit contacting a screw cap 104 in an illustrative embodiment. FIG. 16 shows a decapper tool 1604, which may be an example of a decapper tool 504 as discussed above. Decapper tool 1604 comprises a rotary tool 1620 and a rotating bit 1622. Rotary tool 1620 is a handheld power tool comprising a motor (e.g., electric motor, battery-powered motor, pneumatic motor, etc.) configured to rotate or spin a rotating end 1628. Bit 1622 is configured to attach to rotating end 1628 of rotary tool 1620. In an embodiment, when rotating bit 1622 is brought into contact with a screw cap 104, the rotating bit 1622 may contact the edge 208 of the screw cap 104 as shown in FIG. 16. Hypothetically, a decapper tool could be used in a manner where the decapper tool is brought into contact with a screw cap 104 axially. For example, a screw cap 104 has a spin axis 1650 about which the screw cap 104 spins via threads 110-111 (see also, FIG. 1). A decapper tool may be moved axially along the spin axis 1650 to bring the bit into contact with the top end 204 and/or side wall 202 of the screw cap 104 (see also, FIG. 2). Drawbacks of such a decapper tool may be that a machined bit may be needed for different screw caps 104, and a machined bit may need to be changed to handle different sizes of screw caps 104.

In FIG. 16, rotating bit 1622 contacts edge 208 of the screw cap 104 so that the primary engagement between rotating bit 1622 and the screw cap 104 is at edge 208. For example, decapper tool 1604 may be held at an angle in relation to the spin axis 1650 of the screw cap 104. Thus, rotating bit 1622 contacts the screw cap 104 at an angle 1652 to the spin axis 1650 of the screw cap 104. In an embodiment, the angle 1652 may be in a range of about 30-45 degrees to the spin axis 1650 of the screw cap 104. One technical benefit is rotating bit 1622 may be universal (i.e., is not machined for a specific screw cap 104), and can handle a variety of sizes of screw caps 104.

FIGS. 17-18 illustrate bits 1622 in illustrative embodiments. In FIG. 17, bit 1622 is a hollow cylindrical member 1702 with an open end 1704. At open end 1704, hollow cylindrical member 1702 includes a plurality of surface features 1708 disposed along an inner cylindrical surface 1706. Surface features 1708 may project generally inward toward an interior of hollow cylindrical member 1702 to form points, edges, ridges, or another type of generally rough or course projections on or along inner cylindrical surface 1706 configured to create frictional contact with a screw cap 104. Likewise, in FIG. 18, bit 1622 is a hollow cylindrical member 1802 with an open end 1804. At open end 1804, hollow cylindrical member 1802 includes a plurality of surface features 1808 disposed along an inner cylindrical surface 1806. Surface features 1808 may project generally inward toward an interior of hollow cylindrical member 1802 to form points, edges, ridges, or another type of generally rough or course projections on or along inner cylindrical surface 1806 configured to create frictional contact with a screw cap 104. In a bit 1622 such as in FIGS. 17-18, an inner diameter 1720/1820 of the hollow cylindrical member 1702/1802 may be between about 0.5 and 1.5 times a diameter 220 of the screw caps 104 (see also, FIG. 2). This size of bit 1622 allows for sufficient frictional contact with a screw cap 104. One technical benefit is the decapping process may be performed on screw caps 104 of different diameters 220. Although bits 1622 are shown with a certain geometry or shape, other types of bits are considered herein.

In FIG. 15, for the decapping process, a human operator may move decapper tool 1604 along a process path while jaw members 512-513 immobilize the screw cap test tubes 100 (optional step 1506). In other words, decapper tool 1604 may be "walked" along the row 424 of screw cap test tubes 100 by the human operator to engage the screw caps 104 one-by-one. Moving the decapper tool 1604 along the process path may comprise the following iterative steps. The rotating bit 1622 contacts the screw cap 104 of a screw cap test tube 100 in the row 424 at an angle 1652 to a spin axis 1650 of the screw cap 104 to spin the screw cap 104 in the loosening direction (optional step 1508), as illustrated in FIG. 16. For example, the process path may begin at an outermost screw cap test tube 100 in the row 424 (e.g., the leftmost or rightmost screw cap test tube 100 in the row 424 of FIG. 4). While in contact with the screw cap 104, the rotating bit 1622 is moved in an upward motion to lift or raise the screw cap 104 (optional step 1510).

Figures 19, 20:
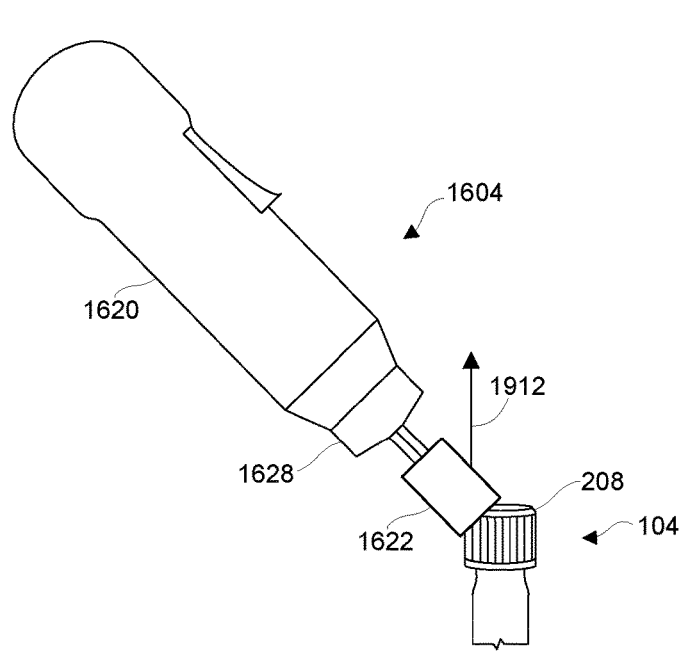
FIG. 19 illustrates a rotating bit lifting a screw cap in an illustrative embodiment.
FIG. 20 illustrates a process path of a decapper tool in an illustrative embodiment.

FIG. 19 illustrates a rotating bit 1622 lifting a screw cap 104 in an illustrative embodiment. The rotating bit 1622 is moved in an upward motion 1912 or in an upward direction. This movement helps to lift or raise the screw cap 104 of the threaded test tube 102 as it is being unscrewed, so that the screw cap 104 may be completely removed from threaded test tube 102. Thus, the upward motion 1912 is generally away from threaded test tube 102 and may be generally parallel to the spin axis 1650. In FIG. 15, after unscrewing or fully removing the screw cap 104, decapper tool 1604 is moved to a next successive screw cap 104 in the row 424 (optional step 1512). Steps 1508-1512 are repeated for each screw cap 104 until each screw cap 104 in the row 424 is unscrewed or fully removed by decapper tool 504.

Although decapper tool 1604 is manipulated by a human operator in the above embodiment, other embodiments may include an automated system for manipulating the decapper tool 1604. For example, a robotic arm or the like may have an end effector that manipulates decapper tool 1604 working in accordance with a numerical control program.

FIG. 20 illustrates a process path 2002 of decapper tool 504 in an illustrative embodiment. FIG. 20 is a front view of a row 424 of screw cap test tubes 100 secured by row clamp 510 (similar to a view of a human operator). Starting with the first screw cap test tube 100 in the row 424 (i.e., the leftmost screw cap test tube 100), the process path 2002 may include a U-shaped motion 2004 at each of the screw caps 104. In the descending portion 2006 of the U-shaped motion 2004, the human operator brings rotating bit 1622 into contact with the screw cap 104, where frictional contact between the rotating bit 1622 and the screw cap 104 imparts an unscrewing rotation to the screw cap 104. While in contact with the screw cap 104, the human operator moves the rotating bit 1622 in an upward motion to lift or raise the screw cap 104 while it is being unscrewed, which comprises the ascending portion 2008 of the U-shaped motion 2004. This upward motion provides an upward force to assist in removing the screw cap 104 from the threaded test tube 102 as the screw cap 104 is being unscrewed. The human operator then moves decapper tool 1604 to a next successive screw cap 104 in the row 424, which may comprise a generally lateral motion 2010 of decapper tool 1604. The U-shaped motion 2004 is then repeated at each successive screw cap 104 in the row 424.

Figure 21:
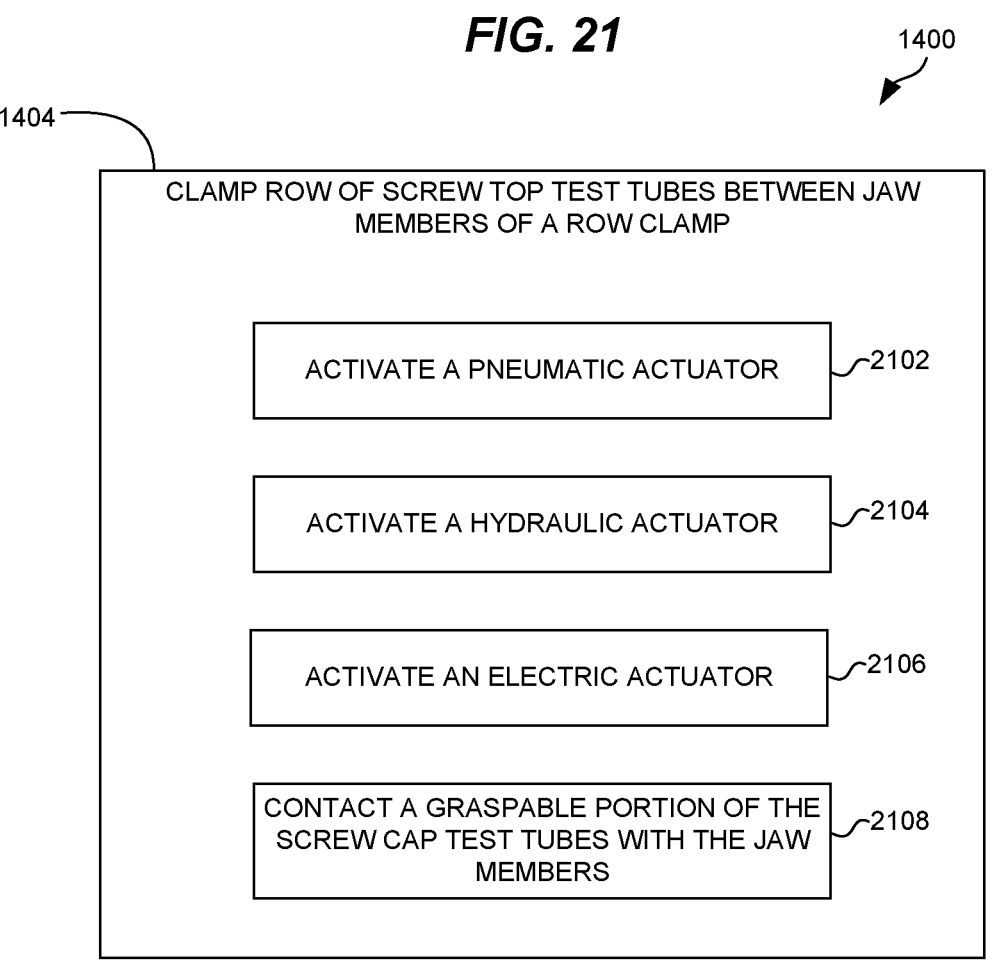
FIG. 21 is a flow chart illustrating additional details of the method of FIG. 14 in an illustrative embodiment.
Figure 22:
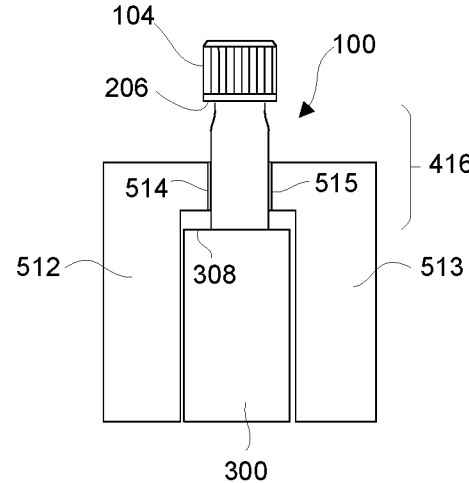
FIG. 22 is a side view illustrating clamping of screw cap test tubes in an illustrative embodiment.

FIG. 21 is a flow chart illustrating additional details of method 1400 in an illustrative embodiment. More particularly, FIG. 21 illustrates optional steps of step 1404 of FIG. 14. As described above, row clamp 510 may comprise a power clamp. Thus, in clamping the row 424 of screw cap test tubes 100 between jaw members 512-513, a pneumatic actuator 1331 may be activated (optional step 2102), a hydraulic actuator 1332 may be activated (optional step 2104), an electric actuator 1333 may be activated (optional step 2106), or another type of actuator may be activated to move one or both of jaw members 512-513. Further, jaw members 512-513 may contact a particular region of the screw cap test tubes 100 when in the clamped position 701. More particularly, the clamp surfaces 514-515 (or the pliable material 1012-1013 on the clamp surfaces) of jaw members 512-513 may contact a graspable portion 416 of the screw cap test tubes 100 (optional step 2108). FIG. 22 is a side view illustrating clamping of screw cap test tubes 100 in an illustrative embodiment. As shown in FIG. 22 (see also, FIG. 4), the graspable portion 416 of the screw cap test tubes 100 is between the top surface 308 of the test tube rack 300 and a bottom end 206 of the screw caps 104. Thus, the clamp surfaces 514-515 of jaw members 512-513 contact the graspable portion 416 of the screw cap test tubes 100.

Figure 23:
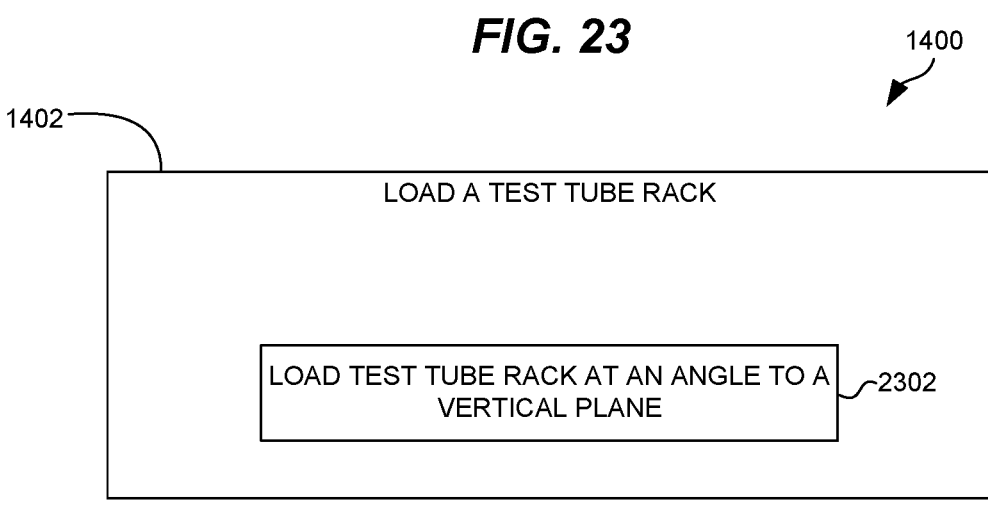
FIG. 23 is a flow chart illustrating additional details of the method of FIG. 14 in an illustrative embodiment.
Figure 24:
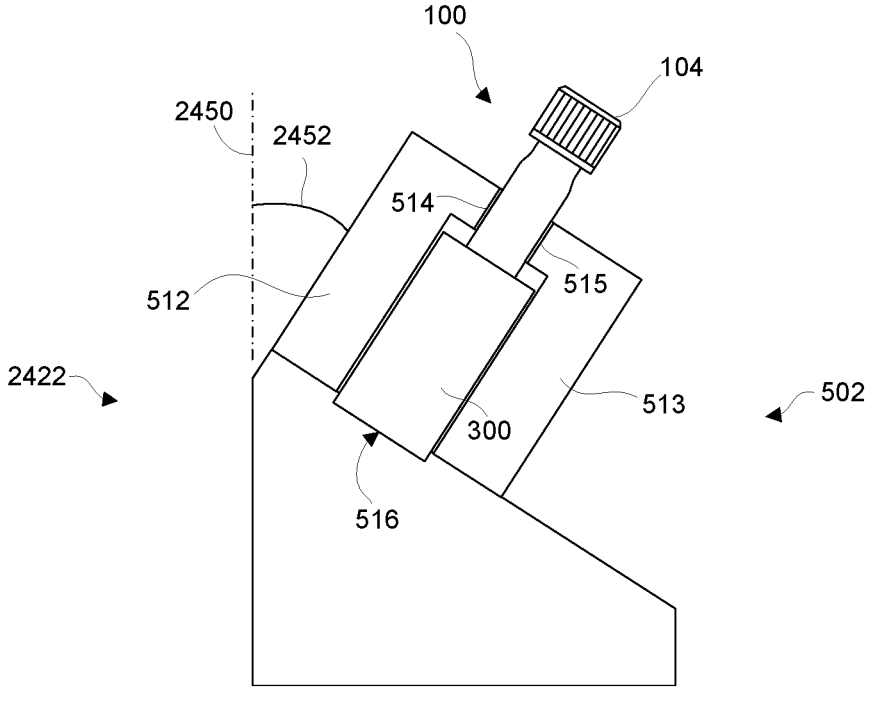
FIG. 24 is a side view illustrating a test tube rack loaded onto a retention apparatus in an illustrative embodiment.

FIG. 23 is a flow chart illustrating additional details of method 1400 in an illustrative embodiment. More particularly, FIG. 23 illustrates an optional step of step 1402 of FIG. 14, where a test tube rack 300 is loaded or registered onto retention apparatus 502. In an embodiment, test tube rack 300 may be loaded or registered onto retention apparatus 502 at an angle to a vertical plane (optional step 2302). FIG. 24 is a side view illustrating test tube rack 300 loaded onto retention apparatus 502 in an illustrative embodiment. As described above, retention apparatus 502 includes a rack holder 516 configured to hold a test tube rack 300. In an embodiment, rack holder 516 is configured to hold the test tube rack 300 at an angle 2452 to a vertical plane 2450. Consequently, the screw cap test tubes 100 held by test tube rack 300 are also at an angle 2452 to a vertical plane 2450. The angle 2452 may be in a range of about 30-45 degrees. In this embodiment, test tube rack 300 is angled away from a front 2422 of retention apparatus 502 (i.e., screw caps 104 are angled away from the front 2422), such as where an operator of the decapper tool 1604 would be positioned. However, test tube rack 300 may be angled toward the front 2422 of retention apparatus 502. One technical benefit of angling the screw cap test tubes 100 is the decapper tool 1604, when operated by a human operator, may be oriented generally vertical or close to vertical, but rotating bit 1622 of decapper tool 1604 will still contact the screw caps 104 at a desired angle (i.e., contact edges 208).

FIG. 25 is a flow chart illustrating additional details of method 1400 in an illustrative embodiment. Method 1400 may include conveying the screw caps 104, which were removed from screw cap test tubes 100, to a receptacle with a cap chute 1206 (optional step 2502). An example of a cap chute 1206 is further illustrated in FIG. 26.

Figure 26:
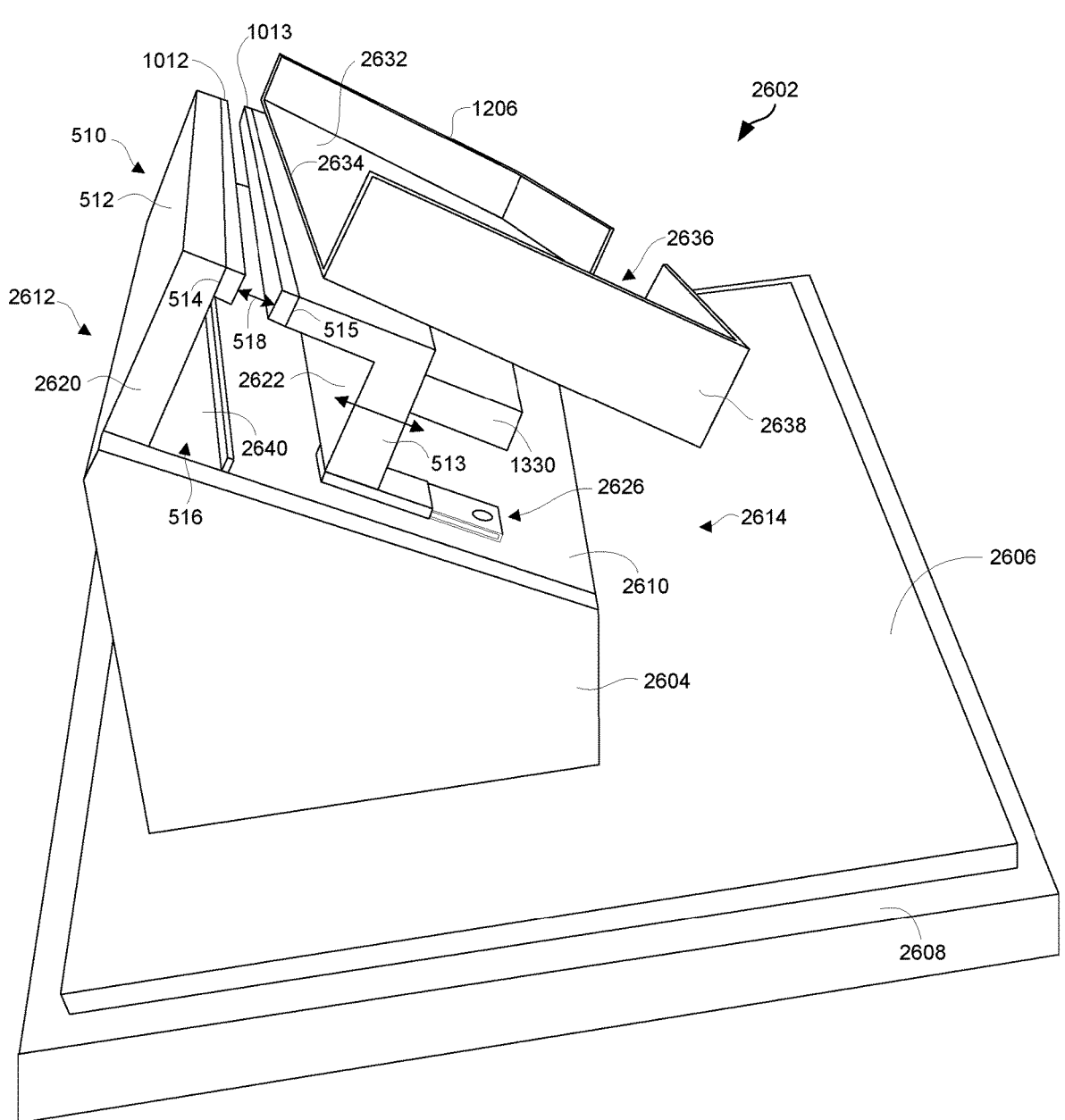
FIG. 26 illustrates a retention apparatus in an illustrative embodiment.

FIG. 26 illustrates a retention apparatus 2602 in an illustrative embodiment. Retention apparatus 2602 may represent an example of retention apparatus 502 described above. Retention apparatus 2602 is a mechanical device configured to secure a plurality of screw cap test tubes 100 stationary during a decapping process. In an embodiment, retention apparatus 2602 includes a base member 2604 attached to a base plate 2606. Base plate 2606 may be a generally flat or planar member configured to rest on a laboratory surface. For example, retention apparatus 2602 may be a bench-top apparatus, and base plate 2606 may be configured to rest or be secured to a bench top 2608. Although not visible in FIG. 26, a bottom surface of base plate 2606 may include feet (e.g., adjustable feet) configured to level base plate 2606, and/or mount features to secure base plate 2606 to bench top 2608 or another surface.

Base member 2604 includes a generally flat top surface 2610 that slopes downward from a front side 2612 of retention apparatus 2602 to a back side 2614. A row clamp 510 is disposed on top surface 2610 of base member 2604. As described above, row clamp 510 is a mechanical clamping device configured to apply an anti-rotation clamping force concurrently to a row 424 of screw cap test tubes 100 held by a test tube rack 300. In an embodiment, row clamp 510 comprises opposing jaw members 512-513. Jaw member 512 may comprise a plate member 2620 disposed generally perpendicular to top surface 2610, and at an angle to base plate 2606. Jaw member 512 includes a clamp surface 514, with a pliable material 1012 disposed along clamp surface 514. Jaw member 513 may comprise an L-shaped member 2622 where a portion of the L-shaped member 2622 is disposed generally perpendicular to top surface 2610 and another portion of the L-shaped member 2622 is disposed generally parallel to top surface 2610. Jaw member 513 includes a clamp surface 515, which is generally parallel to clamp surface 514 of jaw member 512. A pliable material 1013 is disposed along clamp surface 515 of jaw member 513. Clamp surfaces 514-515 are disposed at an angle to a vertical plane in a range of about 30-45 degrees.

In an embodiment, jaw member 512 is fixed to base member 2604, while jaw member 513 is slidable or movable in relation to jaw member 512 and base member 2604. Row clamp 510 may further include one or more slides 2626 that attach jaw member 513 to base member 2604. Slides 2626 allow jaw member 513 to slide or translate along top surface 2610 so that jaw member 513 may move toward and away from jaw member 512. Although slides 2626 are shown, other types of moveable connectors may be used to allow jaw member 513 to move in relation to jaw member 512.

In an embodiment, row clamp 510 further include a movement device 1330 configured to produce or impart movement to jaw member 513. For example, movement device 1330 may include pneumatic actuators 1331 (e.g., pneumatic cylinders), hydraulic actuators 1332, electric actuators 1333, etc.

Retention apparatus 2602 further includes a rack holder 516 disposed below or beneath a gap 518 between jaw members 512-513. Rack holder 516 is a structure that holds a test tube rack 300 (or multiple test tube racks 300) stationary. As shown in FIG. 26, rack holder 516 may comprise a rectangular channel 2640 or the like having similar dimensions as a test tube rack 300 (i.e., similar length and/or width). Thus, test tube rack 300 may be at least partially inserted in the rectangular channel 2640, which acts to hold the test tube rack 300. However, other configurations are considered herein for rack holder 516. As evident in FIG. 26, rectangular channel 2640 is disposed at an angle to a vertical plane, such as in a range of about 30-45 degrees. Thus, test tube rack 300 is held at an angle within retention apparatus 2602.

Retention apparatus 2602 further includes a cap chute 1206. Cap chute 1206 comprises a sloping channel or slide configured to convey screw caps 104, which are removed from screw cap test tubes 100, to a receptacle (not shown). In an embodiment, cap chute 1206 includes a generally flat surface 2632 that slopes downward from a front end 2634 to a back end 2636. Cap chute 1206 further includes side walls 2638 that project upward from flat surface 2632. Front end 2634 is disposed proximate to jaw members 512-513. When a row 424 of screw cap test tubes 100 is clamped via jaw members 512-513, screw caps 104 removed during a decapping process may be captured by cap chute 1206, which then conveys the removed screw caps 104 toward back end 2636 and to a receptacle (not shown). For example, a waste bin or the like may be placed proximate to back end 2636 to catch the removed screw caps 104 conveyed by cap chute 1206.

EXAMPLE

In the following example, additional processes, systems, and methods are described in the context of a decapping process. Assume, for this example, that a plurality of screw cap test tubes 100 are held in a row 424 by a test tube rack 300. The test tube rack 300 is loaded or registered into rectangular channel 2640 of retention apparatus 2602 (see FIG. 26). With test tube rack 300 registered in rectangular channel 2640, movement device 1330 imparts linear movement to jaw member 513 toward jaw member 512 to clamp on opposing sides 710-711 of the row 424 of screw cap test tubes 100. Thus, the screw cap test tubes 100 in the row 424 are immobilized simultaneously or concurrently by an anti-rotation clamping force applied by jaw members 512-513. Due to the orientation of jaw members 512-513 and rectangular channel 2640, test tube rack 300 and the screw cap test tubes 100 are held at an angle within retention apparatus 2602. A human operator stands facing the front side 2612 of retention apparatus 2602, so the screw caps 104 of the screw cap test tubes 100 are angled away from the human operator.

With screw cap test tubes 100 restrained by row clamp 510, the rotating bit 1622 of decapper tool 1604 successively contacts screw caps 104 (e.g., at an angle) of the screw cap test tubes 100 in the row 424 to impart an unscrewing rotation to the screw caps 104. For example, a human operator may move decapper tool 1604 along a process path while jaw members 512-513 immobilize the screw cap test tubes 100. The decapper tool 1604 may be "walked" along the row 424 of screw cap test tubes 100 by the human operator to engage the screw caps 104 one-by-one. For example, starting with the first screw cap test tube 100 in the row 424, the process path 2002 may include a U-shaped motion 2004 at each of the screw caps 104 (see FIG. 20). Screw caps 104 that are removed during the decapping process are captured by cap chute 1206, which conveys the removed screw caps 104 to a receptacle, such as a waste bin.

With the screw caps 104 unscrewed or removed, movement device 1330 imparts linear movement to jaw member 513 away from jaw member 512 to unclamp the row 424 of screw cap test tubes 100. Test tube rack 300 may then be removed from retention apparatus 2602, and another test tube rack 300 may be loaded. One technical benefit is screw caps 104 may be unscrewed from a large number of screw cap test tubes 100 in a fast and efficient manner, which improves laboratory operations.

Although specific embodiments were described herein, the scope of the invention is not limited to those specific embodiments. The scope of the invention is defined by the following claims and any equivalents thereof.

What is claimed is:

1. A method of performing a decapping process for screw cap test tubes each comprising a screw cap having threads configured to engage with threads of a threaded test tube, the method comprising:

loading a test tube rack in a rack holder of a retention apparatus that holds the test tube rack stationary, wherein the test tube rack holds the screw cap test tubes aligned in a row;

clamping the row of the screw cap test tubes between a pair of jaw members of a row clamp of the retention apparatus, wherein clamp surfaces of the jaw members apply a force to opposing sides of the row of the screw cap test tubes, and wherein the retention apparatus holds the test tube rack at an angle of about 30-45 degrees relative to a vertical plane; and successively contacting screw caps of the screw cap test tubes in the row with a rotating bit of a decapper tool to spin the screw caps in a loosening direction, wherein successively contacting the screw caps comprises contacting each screw cap of the screw caps with the rotating bit at a non-zero angle relative to a spin axis of the screw cap.

2. The method of claim 1 further comprising:

unclamping the row of the screw cap test tubes from the jaw members; and removing the test tube rack.

3. The method of claim 1 wherein successively contacting the screw caps comprises:

contacting edges of the screw caps with the rotating bit.

4. The method of claim 1 wherein:

the decapper tool comprises a handheld tool; and successively contacting the screw caps comprises:

moving, by a human operator, the handheld tool along a process path to engage the screw caps one-by-one.

5. The method of claim 1 wherein:

the non-zero angle is in a range of about 30-45 degrees to the spin axis of the screw cap.

6. The method of claim 1 wherein successively contacting the screw caps comprises:

iteratively performing:

contacting a screw cap of a screw cap test tube in the row with the rotating bit at the non-zero angle to the spin axis;

moving the rotating bit using an upward motion while in contact with the screw cap to lift the screw cap; and moving the decapper tool to a next successive screw cap in the row.

7. The method of claim 1 wherein clamping the row of the screw cap test tubes comprises:

activating a pneumatic actuator to move at least one of the jaw members.

8. The method of claim 1 wherein clamping the row of screw cap test tubes comprises:

activating a hydraulic actuator to move at least one of the jaw members.

9. The method of claim 1 wherein clamping the row of the screw cap test tubes comprises:

activating an electric actuator to move at least one of the jaw members.

10. The method of claim 1 wherein clamping the row of the screw cap test tubes comprises:

contacting a graspable portion of the screw cap test tubes between a top surface of the test tube rack and a bottom end of the screw caps with the clamp surfaces of the jaw members.

11. The method of claim 1 further comprising:

conveying the screw caps removed from the screw cap test tubes to a receptacle with a cap chute.

12. The method of claim 1 wherein clamping the row of the screw cap test tubes comprises:

applying the force to the opposing sides of the row of the screw cap test tubes with the jaw members in a pressure range that prevents rotation of the screw cap test tubes.

13. A method of performing a decapping process for screw cap test tubes each comprising a screw cap having threads configured to engage with threads of a threaded test tube, the method comprising:

loading a test tube rack in a rack holder of a retention apparatus that holds the test tube rack stationary, wherein the test tube rack holds the screw cap test tubes aligned in a row;

clamping the row of the screw cap test tubes between a pair of jaw members of a row clamp of the retention apparatus, wherein the jaw members include clamp surfaces that contact opposing sides of the row of the screw cap test tubes, and wherein the retention apparatus holds the test tube rack at an angle of about 30-45 degrees relative to a vertical plane; and moving a decapper tool along a process path while the jaw members immobilize the screw cap test tubes;

wherein along the process path, a rotating bit of the decapper tool successively contacts each screw cap of the screw cap test tubes in the row at a non-zero angle to a spin axis of the screw cap to impart an unscrewing rotation to the screw cap.

14. A decapping system, comprising:

a retention apparatus configured to receive a test tube rack that holds screw cap test tubes aligned in a row, the retention apparatus comprising:

a row clamp comprising a pair of jaw members having clamp surfaces configured to contact opposing sides of the row of the screw cap test tubes; and a decapper tool comprising a rotating bit configured to successively contact screw caps of the screw cap test tubes in the row to spin the screw caps in a loosening direction, wherein the retention apparatus is configured to hold the test tube rack at an angle of about 30-45 degrees relative to a vertical plane.

15. The decapping system of claim 14, wherein:

the clamp surfaces of the jaw members are configured to contact a graspable portion of the screw cap test tubes between a top surface of the test tube rack and a bottom end of the screw caps.

16. The decapping system of claim 14, wherein the row clamp further comprises:

a pliable material disposed along at least one of the clamp surfaces.

17. The decapping system of claim 14, wherein the row clamp further comprises:

a pneumatic actuator configured to move at least one of the jaw members.

18. The decapping system of claim 14, wherein the retention apparatus further comprises:

a cap chute configured to convey the screw caps removed from the screw cap test tubes to a receptacle.

19. The decapping system of claim 14, wherein:

the clamp surfaces are disposed at the angle of about 30-45 degrees relative to the vertical plane.

20. The decapping system of claim 14, wherein:

the rotating bit comprises:

a hollow cylindrical member with surface features disposed along an inner cylindrical surface of the hollow cylindrical member; and an inner diameter of the hollow cylindrical member is between about 0.5 and 1.5 times a diameter of the screw caps.

\* \* \* \* \*